(12) United States Patent
Jaspers et al.

(10) Patent No.: US 7,641,438 B2
(45) Date of Patent: Jan. 5, 2010

(54) VARIABLE-SIZED MOLDED PRODUCT TRAY DENESTING APPARATUS

(75) Inventors: Jerry Jaspers, East Wenatchee, WA (US); Robert Simpson, East Wenatchee, WA (US); Carl Van Doren, East Wenatchee, WA (US); David Reed, Wenatchee, WA (US)

(73) Assignee: Keyes Fibre Corporation, Wenatchee, WA (US)

( * ) Notice: Subject to any disclaimer, the term of this patent is extended or adjusted under 35 U.S.C. 154(b) by 211 days.

(21) Appl. No.: 10/919,179

(22) Filed: Aug. 16, 2004

(65) Prior Publication Data

US 2005/0053455 A1   Mar. 10, 2005

Related U.S. Application Data

(60) Provisional application No. 60/495,208, filed on Aug. 14, 2003.

(51) Int. Cl.
- B65G 59/10  (2006.01)
- B65G 59/04  (2006.01)
- B65H 3/00   (2006.01)

(52) U.S. Cl. .......... 414/795.6; 221/211; 221/241; 221/297; 414/797.8; 414/797; 414/797.4

(58) Field of Classification Search .......... 414/795.6, 414/795.7, 78.2, 788.6, 798.4, 793, 793.1, 414/797, 797.4, 797.8; 221/221, 222; 294/65, 294/64.1; 901/40

See application file for complete search history.

(56) References Cited

U.S. PATENT DOCUMENTS

| | | | |
|---|---|---|---|
| 3,606,960 A * | 9/1971 | Butterworth | 221/211 |
| 3,920,128 A * | 11/1975 | Baker | 414/737 |
| 4,082,203 A * | 4/1978 | Schjeldahl | 221/211 |
| 4,260,311 A | 4/1981 | Hanses | |
| 4,345,658 A * | 8/1982 | Danel et al. | 180/8.5 |
| 4,350,466 A | 9/1982 | Bahr et al. | |
| 4,493,599 A * | 1/1985 | Hartness et al. | 414/796.2 |
| 4,991,741 A | 2/1991 | Anderson | |
| 5,013,213 A | 5/1991 | Roberts et al. | |
| 5,064,093 A | 11/1991 | Davis et al. | |
| 5,133,169 A | 7/1992 | Tesch, Jr. et al. | |
| 5,609,377 A * | 3/1997 | Tanaka | 294/65 |

(Continued)

FOREIGN PATENT DOCUMENTS

JP       55119630 A  *  9/1980

Primary Examiner—Gregory W Adams
(74) Attorney, Agent, or Firm—Vedder Price P.C.

(57) ABSTRACT

A tray denesting apparatus is provided comprising a receptacle for holding at least one nested stack of packing trays. A conveyer belt is further provided for receiving each of the packing trays upon release from the receptacle. The denesting apparatus has at least one set of soft flexible suction cups disposed below the conveyer belt and which are disposed on a bellows assembly which is moveable between a first position and a second position so that at least one of the soft flexible suction cups may adhere to a first one of the packing trays, and successive packing trays. The tray denester further may include an automatic adjustment apparatus to correspond with selected size parameters of the trays being utilized. As a result, an individual tray may be removed from the receptacle, deposited on the conveyer belt and the conveyer belt then advancing the selected tray to the required area of use.

21 Claims, 21 Drawing Sheets

U.S. PATENT DOCUMENTS

| | | |
|---|---|---|
| 5,674,048 A * | 10/1997 | Rich ........................ 414/797.5 |
| 5,676,518 A * | 10/1997 | Okubo et al. ............ 414/797.1 |
| 5,700,004 A | 12/1997 | Bahr et al. |
| 5,704,194 A | 1/1998 | Niehaus |
| 5,746,571 A * | 5/1998 | Dietschi et al. .......... 414/795.7 |
| 5,788,116 A | 8/1998 | Bednar |
| 5,876,180 A * | 3/1999 | Sims ........................ 414/795.6 |
| 5,943,842 A * | 8/1999 | de Koning et al. ............ 53/247 |
| 5,988,718 A * | 11/1999 | Sugimoto et al. ............. 294/65 |
| 6,159,322 A | 12/2000 | Ogata et al. |
| 6,206,361 B1 * | 3/2001 | Geldmeier .................. 271/9.12 |
| 6,558,110 B2 * | 5/2003 | Lu et al. ................... 414/798.1 |
| 6,623,236 B1 | 9/2003 | Barnes |
| 2002/0084280 A1 * | 7/2002 | Haven et al. ................. 221/242 |
| 2002/0092390 A1 * | 7/2002 | Nakajima ....................... 83/86 |

\* cited by examiner

VARIABLE-SIZED MOLDED PRODUCT TRAY DENESTING APPARATUS

The present application claims priority from provisional patent application Ser. No. 60/495,208 entitled "Variable Size Molded Product Tray Denesting Apparatus" filed Aug. 14, 2003, having the identical inventors and assignee of the present invention.

BACKGROUND OF THE INVENTION

1. Field of the Invention

The present invention relates to tray dispensing devices. More particularly it relates to a tray dispensing device for molded trays of a variety of sizes which retains a stack of nested trays and dispenses individual trays from the nested stack.

2. Description of the Related Art

Trays for dispensing food items are widely known. Automatic tray dispensers for use in the packaging of such food items may be found in U.S. Pat. No. 5,788,116, Adjustable Tray Dispenser. Similarly, the following ten United States patent describe denesting devices which utilizes suction at some point in the apparatus: U.S. Pat. Nos. 6,623,236; 6,159,322; 5,704,194; 5,700,004; 5,133,169; 5,064,093; 5,013,213; 4,991,741; 4,350,466; and 4,260,311. However, a problem has remained in the tray denesting field for accurately separating one tray from a stack of trays, for preventing jamming of such denesting apparatus and for denesting trays having irregularly shaped surfaces thereon. In addition, although adjustable tray denesting apparatus have been provided in the past, no known apparatus includes automatic adjustment of the hopper for a specified number of different size trays.

It has also been known in the art to use suction devices from removing a single item from a stack of items. However, such devices have had the single item removed from the top o the stack. It was unknown to remove a single item, such as a tray, from the bottom of a stack using suction.

SUMMARY OF THE INVENTION

A tray denesting apparatus is provided which includes a receptacle for holding a nested stack of trays. The receptacle further includes a tray size adjustment apparatus. The tray size adjustment apparatus is movable between a first position and a second position prior to loading of the trays into the receptacle so as to allow dispensing of a plurality of tray sizes.

The apparatus further includes a mechanism for denesting individual trays from the nested stack of trays and for depositing the individual trays onto a conveyer belt upon release from the receptacle.

The tray size adjustment apparatus includes a front adjusting bar, a rear adjusting bar disposed in parallel alignment with the front adjusting bar, a first side adjusting bar, and a second side adjusting bar disposed in parallel alignment with the first side adjusting bar. The front adjusting bar is disposed in perpendicular alignment with the first side adjusting bar. As a result, an opening of the desired size and shape is provided for receiving trays of a selected size. The front adjusting bar, the rear adjusting bar, the first side adjusting bar and the second side adjusting bar are all selectively variable in length to provide the desired size opening. The front adjusting bar, the rear adjusting bar, the first side adjusting bar and the second side adjusting bar may be independently adjustable to move the tray size adjustment apparatus between the first and the second position or the side adjusting bars may be adjusted simultaneously and then the front rear adjusting bars subsequently adjusted. The tray size adjustment apparatus may further include a middle adjusting bar disposed in parallel alignment with both the first side adjusting bar and the second side adjusting bar. Alternatively, the front and rear adjusting bars can be moved followed by a single one of the side adjusting bars to create the desired size opening.

In order to effect movement of the adjusting bars and change the size of the receptacle, either pneumatic cylinders, electric motors or hydraulic cylinders may be utilized. The first and second positions of the adjusting arms correspond approximately to standard size trays, such as those used in the fruit packing industry which include standard trays of 12×19½ inches typically stacked in four, five or six layers and in a 42 lb. bushel box or Euro Trays® which are 14⅝×22½ inches and are packed in 27 lb. cardboard boxes in one, two, or three layers or reusable plastic containers (RPC) in two or three layers.

In a preferred embodiment the invention, a plurality of receptacles are provided so that trays can be sequentially denested from each stack of trays and deposited onto a moving conveyer belt which extends below the receptacles. The conveyer belt can then direct the denested trays to a second conveyer used for loading of products such as fruit into the trays. Alternative size trays can be deposited for stacking purposes, or the same size trays can be stacked in reversed position, also for stacking after being filled with fruit. The receptacle maintains each of the trays in a face up alignment biased towards the bottom end of the receptacle.

In a preferred embodiment the mechanism for denesting or removing a single tray from the stack of trays includes at least one set of soft flexible suction cups operatively connected to and disposed on a bellows assembly the suction cups being disposed below the conveyor belt. The bellow assembly is movable between a first position not in contact with the trays and a second position in contact with the bottom tray so that the suction cups may adhere to the first one of the trays. i.e. the bottom tray. The bellows assembly further includes a plurality of shafts, one of the soft flexible suction cups being disposed on the top end of each of the plurality of shafts. The shafts are mounted on pivotable and extendable arms so as to allow adjustment to a desired location on the tray size desired. The bellows assembly is connected to a source of vacuum which is operated sequentially so that when the suction cups come into contact with the bottom tray on the stack of trays, the vacuum is conveyed through the suction cups so that the suction cups adhere to the bottom tray. The bottom tray may then be denested by lowering the suction cups. An advantage of the present invention is that a single tray can be removed from the bottom of a stack using suction, which firmly grips the tray and allows a shorter movement of the tray onto the conveyor. This allows higher speeds and less wear and tear on the apparatus.

In operation, a method for denesting a tray from a stack of trays in a receptacle is provided. The method includes the steps of selecting a desired size parameter and adjusting the receptacle to correspond with the selected size parameter. A plurality of trays are loaded into the receptacle having dimensions equal to the size parameter. The soft flexible suction cups are moved from a rest position to a contact position with a bottom tray in the stack. Vacuum is applied through the suction cups and thereby to the tray. The suction cups are then lowered causing the tray to be removed from the stack of trays from the receptacle and deposited onto a conveyor belt. The suction cups are then returned to a rest position.

In alternative embodiment of the invention, an additional mechanism is provided for denesting individual trays. A gripper blade assembly is provided which is located within the conveyor belt. When actuated, the gripper blade assembly extends upwardly into contact with the bottom tray in the stack of trays in the receptacle. A pair of gripper blades then are actuated and moved towards each other so as to grip the edges of the bottom tray. The gripper blades and suction cups are then lowered simultaneously so as to securely denest the bottom tray from the stack of trays while allowing the remaining trays to remain in place in the receptacle. The bottom tray is then deposited onto the conveyor belt running through the apparatus. Alternatively, the gripper blade assembly alone may be utilized.

An additional means of retaining the trays in the receptacle is provided by two or more reset platform rails which are selectively extended to support the stack of nested trays or withdrawn to allow denesting of the bottom tray. The rails are extended or withdrawn by means of one or more pneumatic cylinders. The stack of trays are also supported in the receptacle by a plurality of spring loaded tray clamps. As a result of both the reset platform rails and the tray clamps, the stack of trays is secured, but the bottom tray may be removed.

DETAILED DESCRIPTION OF THE PREFERRED EMBODIMENT

Figure 1:
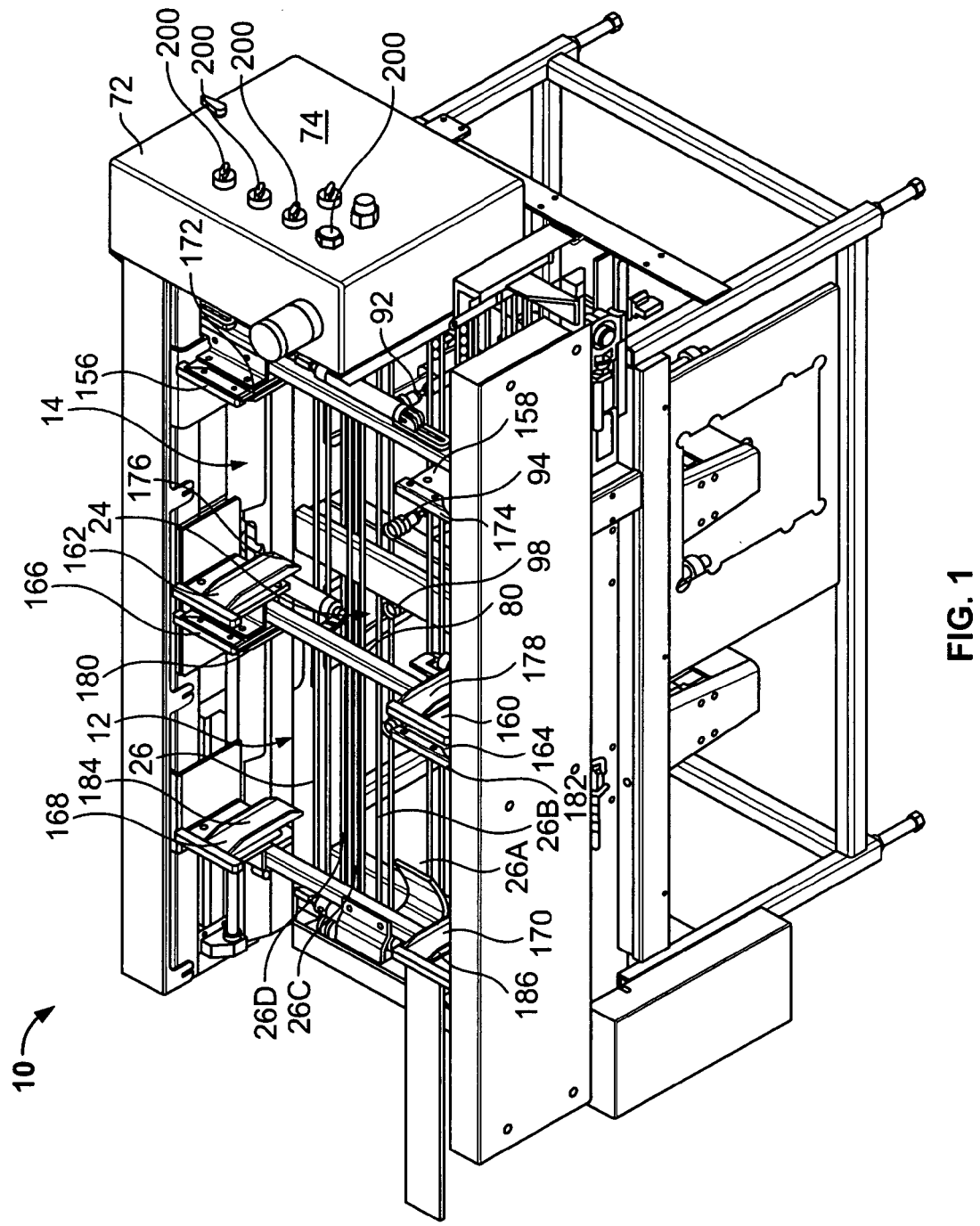
FIG. 1 of the drawings is a front perspective view of the tray denester of the present invention.

While the present invention is susceptible of embodiment in many different forms, there is shown in the drawings and will herein be described in detail several specific embodiments with the understanding that the invention is not limited thereto, except insofar as those who have the disclosure before them are able to make modifications and variations without departing from the scope thereof.

Figure 2:
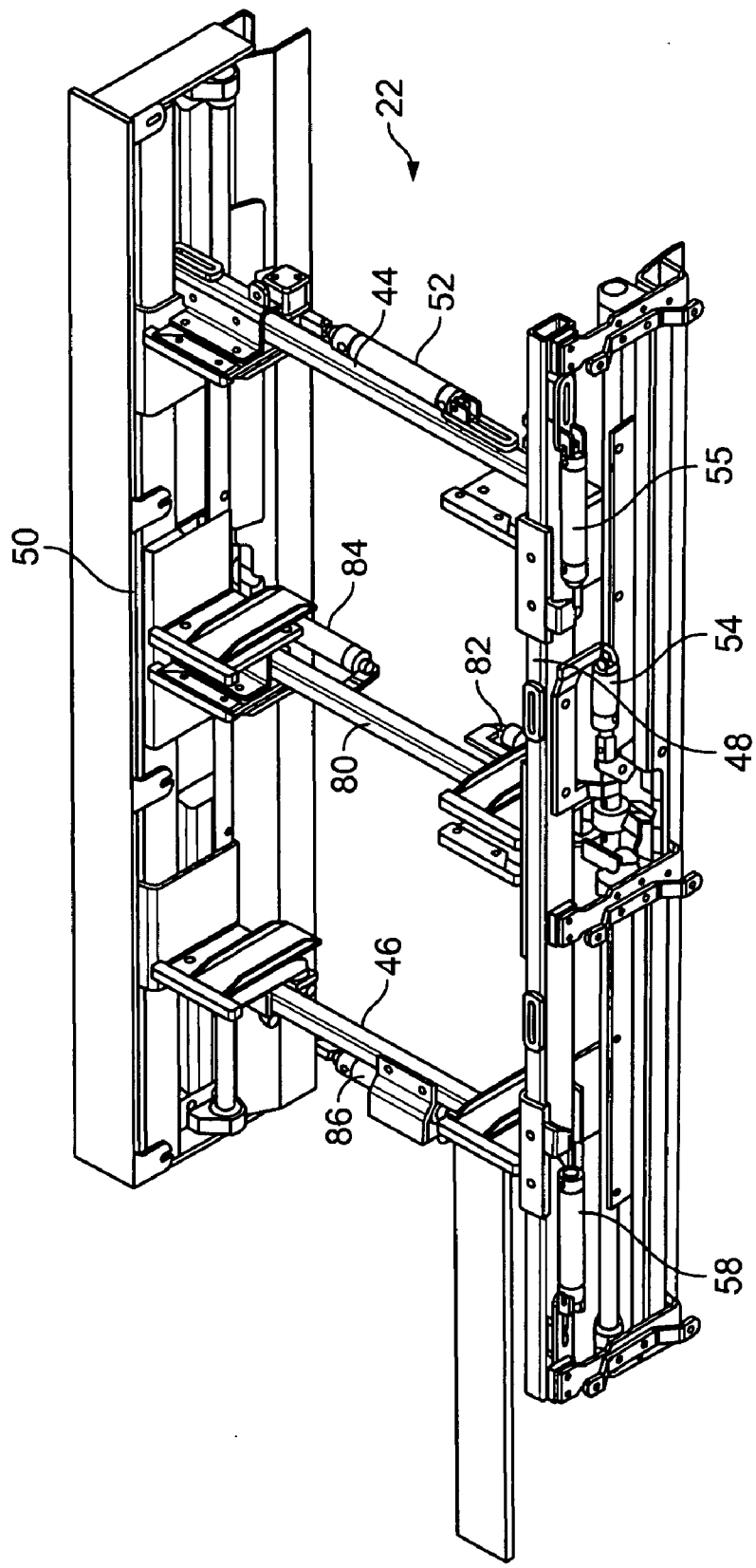
FIG. 2 of the drawings is a front perspective view of the tray size adjustment apparatus of the present invention, as used in the tray denester of FIG. 1 of the drawings.

As shown in FIG. 1 of the drawings, a tray denesting apparatus 10 is provided having a plurality of receptacles 12 and 14 for holding nested stacks 16 and 18 of trays 20. (Best seen in FIG. 13). As best seen in FIG. 2, the tray denesting apparatus 10 includes a tray size adjustment apparatus 22. The tray size adjustment mechanism 22 is movable between a first position wherein the receptacles 12 and 14 are approximately 12×19½ inches in width and length and a second position in which the receptacles 12 and 14 are approximately 14⅝×22½ inches in width and length. The first size corresponds to a standard tray used in the fruit packing industry and the second size corresponds to a Euro Tray® also used in the fruit packing industry for larger fruit. The standard trays are typically stacked using four, five or six layers in a 42 lb. bushel box (not shown). The Euro Trays® are typically packed in twenty-seven pound cardboard boxes in one, two or three layers or reusable plastic containers in two or three layers. Alternate tray layers within a box are typically rotated 180 degrees so the food and trays will interlock. This is accomplished by either loading the two receptacles 12 and 14 in opposite direction or by stacking a standard tray on top of a Euro Tray®.

FIGS. 1, 6-10 and 12 further show a mechanism 24 for denesting individual trays 20 from the nested stacks 16 and 18 of trays 20. In a preferred embodiment, tray denesting apparatus 10 includes a conveyor belt 26 for receiving each of the plurality of trays 20 upon release from the receptacles 12 and 14. In the embodiment shown, conveyor belt 26 comprises a plurality of rubber bands 26A, B, C and D which are mounted on a pair of powered shafts 28 and 30, best seen in FIG. 13. Conveyor belts 26 in turn are driven by a drive motor 32 and drive chain 34 at a desired rate of speed. Conveyor belts 26 are used to advance trays 20 onto packing lines for the depositing of fruit into individual trays 20. It should be noted in this regard, that in a preferred embodiment, individual trays 20 have a series of pockets 36, 38, 40 adapted for the reception of fruit. In Euro Trays®, additional pockets 42 are also found. Pockets 36-42 are by example only; the number of pockets is determined by the size of the fruit and the size of the tray. A plurality of pockets such as pockets 36-42 may be provided.

Figure 3:
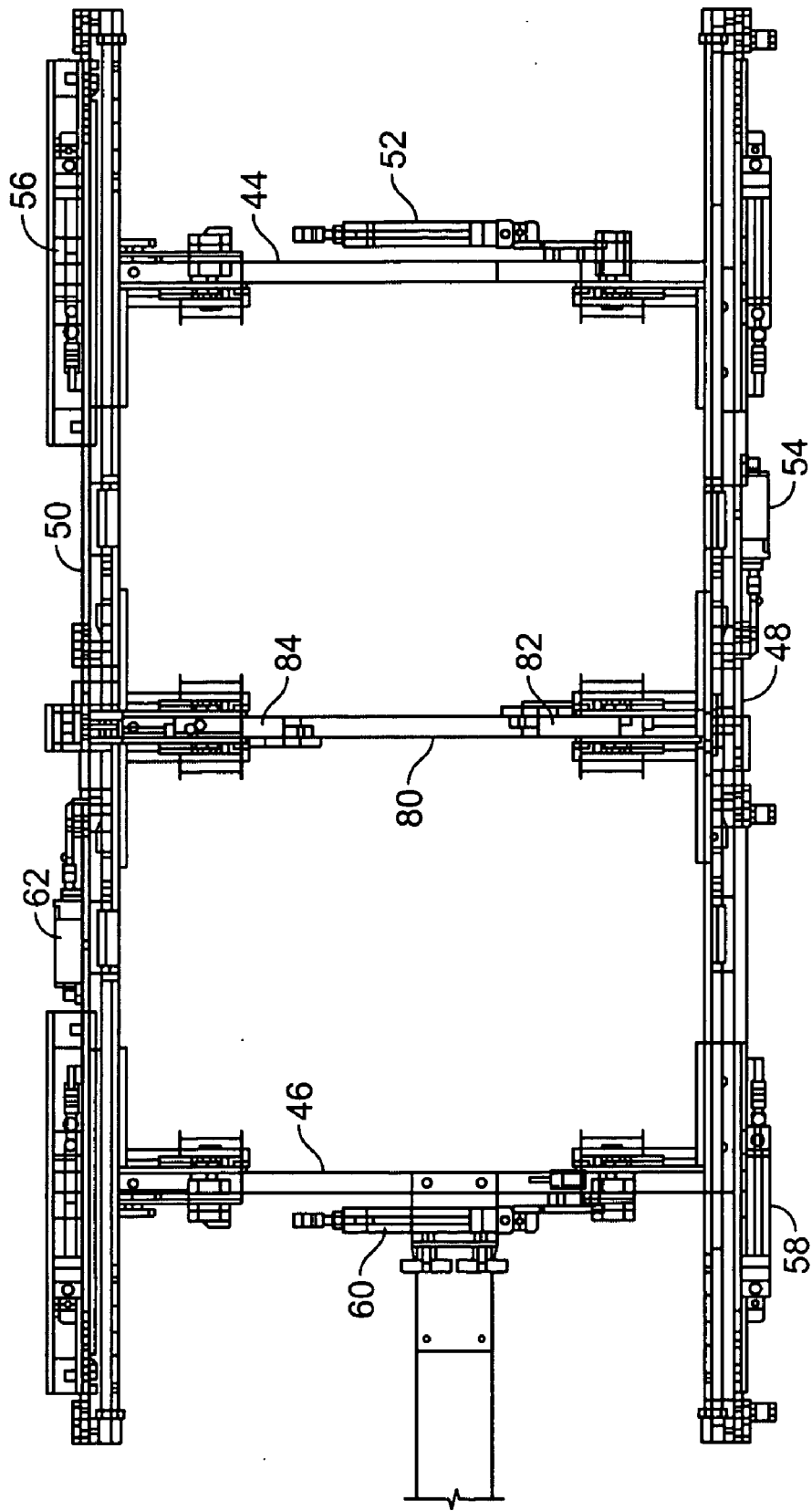
FIG. 3 of the drawings is a top view of the tray size adjustment apparatus of FIG. 2.
Figure 3A:
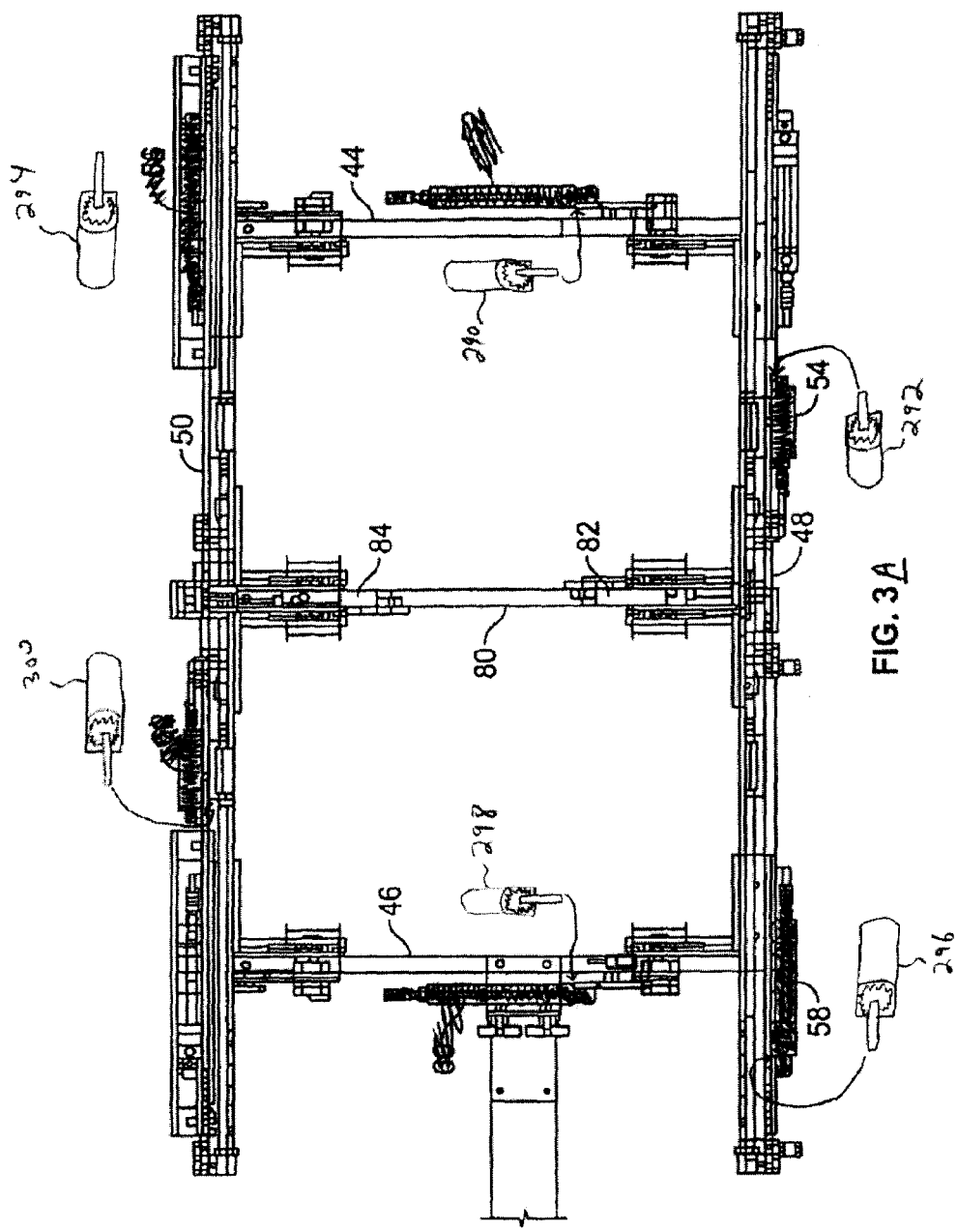
FIG. 3A of the drawings is a top view of the tray size adjustment apparatus of FIG. 2 showing the use of electric motor means for moving the adjusting bars.
Figure 4:
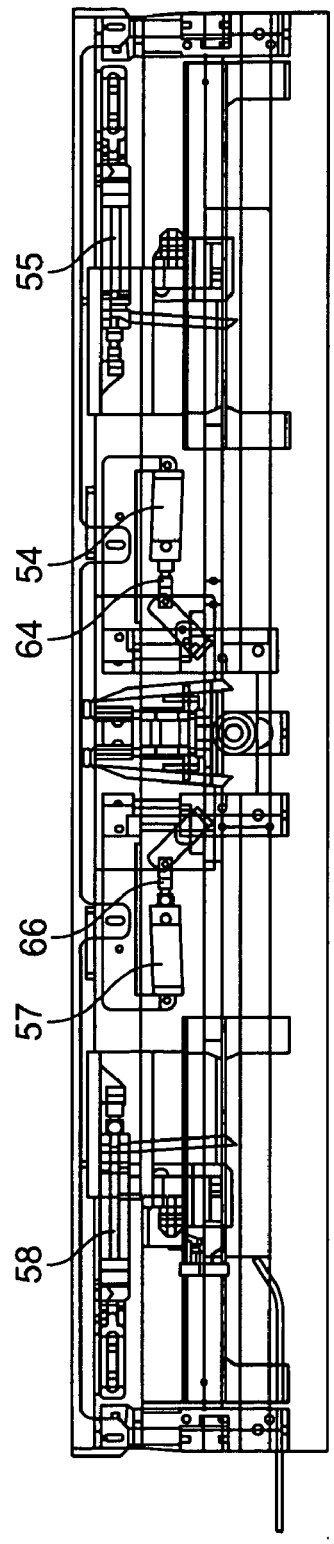
FIG. 4 of the drawings is a side view of the tray size adjustment apparatus of FIGS. 2 and 3.
Figure 5:
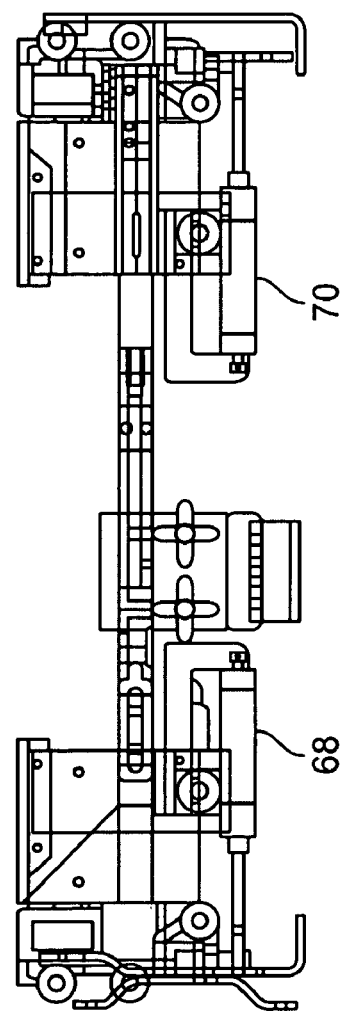
FIG. 5 of the drawings is a front view of the tray size adjustment apparatus of FIGS. 2 and 3.

As seen in FIGS. 1 through 5, the tray size adjustment mechanism 22 includes a front adjusting bar 44, a rear adjusting bar 46, disposed in parallel alignment with the front adjusting bar 44, a first side adjusting bar 48 and a second side adjusting bar 50. The second side adjusting bar 50 is disposed in parallel alignment with the first side adjusting bar 48 and the front adjusting bar 44 is in perpendicular alignment with the first side adjusting bar 48. As best seen in FIGS. 3 through 5, the adjusting bars 44-50 are adjustable in length by means of pneumatic cylinders 52-62. The pneumatic cylinders are connected by means of shafts 64 so as to extend the adjusting bars a desired length and to a desired length and to a desired width. Similar pneumatic cylinders 68 and 70 are seen in FIG. 5 for extending or decreasing the width of the receptacles 12 and 14. When required, the individual adjusting bars 44, 46, 48 and 50 may be adjusted individually as required. However, in a preferred embodiment, standards size dimensions for receptacle 12 and 14 are stored in control system 72 (FIGS. 1, 14, 17 and 18) so that the desired lengths and widths can be adjusted automatically by use of a programmable controller 74 contained within control system 72, best seen in FIG. 14, which in turn actuates pneumatic cylinders and solenoid valves 76 and air pressure regulator 78 so as to cause pneumatic cylinders 52, 54, 56, 58, 60 and 62 to extend or retract shafts 64, 66 and thereby enlarge or reduce in size receptacles 12 and 14.

As further shown in FIGS. 1, 2 and 3, the tray denesting apparatus 10, in a preferred embodiment, further includes a middle adjusting bar 80 having a pair of pneumatic cylinders 82 and 84 operatively connected thereto for assisting in reducing the width of receptacles 12 and 14. Air cylinder 86 is similarly mounted on rear adjusting arm 46. Middle adjusting bar 80 is disposed in perpendicular alignment with the first side adjusting bar 48 and the second side adjusting bar 50. Although the tray adjusting mechanism 50 shown in the drawings shows the use of pneumatic means for moving the adjusting bars, electric motor means 290, 292, 294, 296, 298 and 300 may be substituted for the pneumatic cylinders 52, 54, 56, 58, 60, 62 and 84. Similarly, a hydraulic system utilizing a hydraulic pump may be utilized for extending or retracting the adjusting bars in order to effect changing the size of receptacles 12 and 14.

Figure 6:
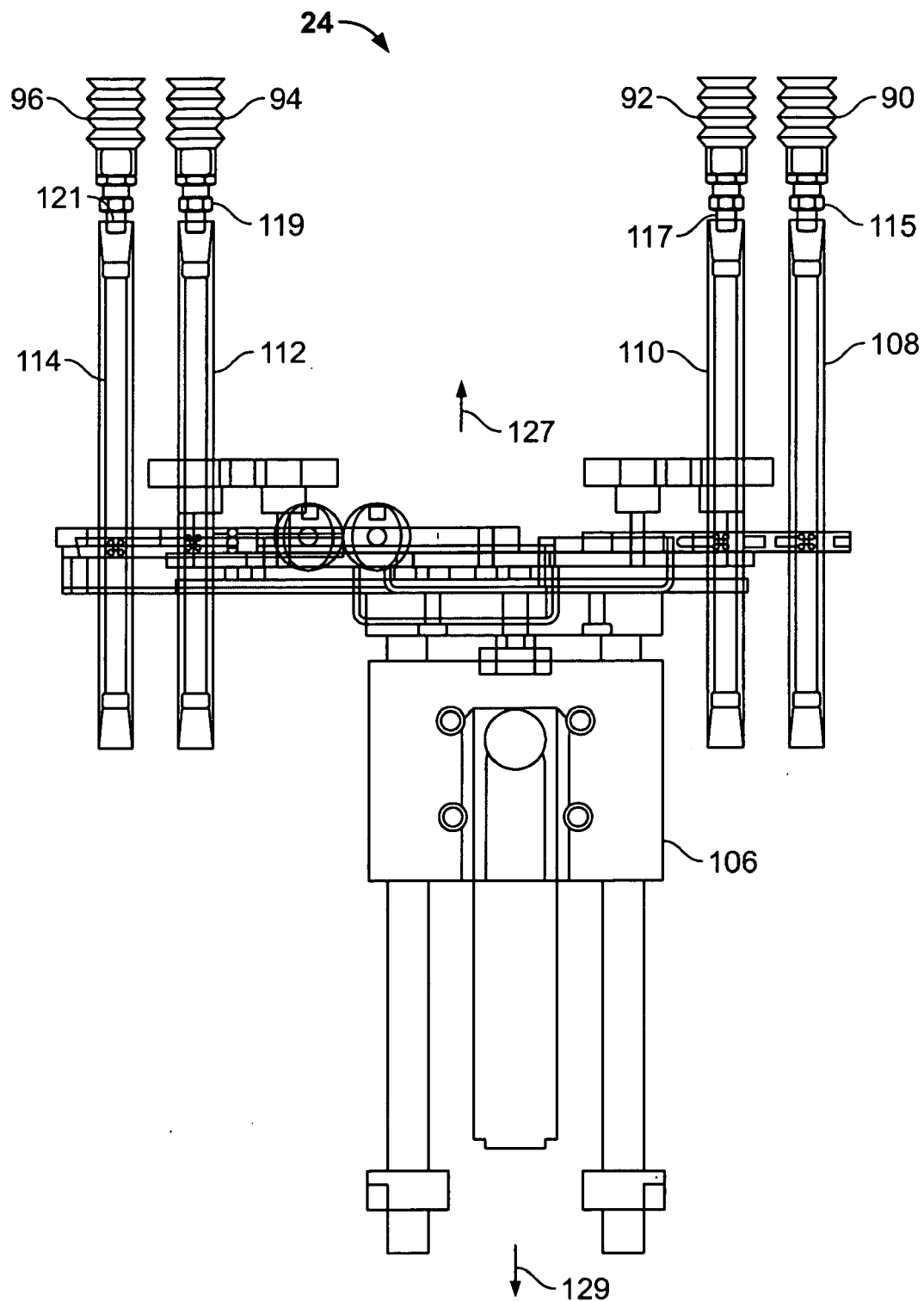
FIG. 6 of the drawings is a front elevational view of sets of soft flexible suction cups mounted on the top end of a plurality of shafts which, in turn, are connected to a bellows assembly, as utilized in the tray denester apparatus of FIG. 1.
Figure 7:
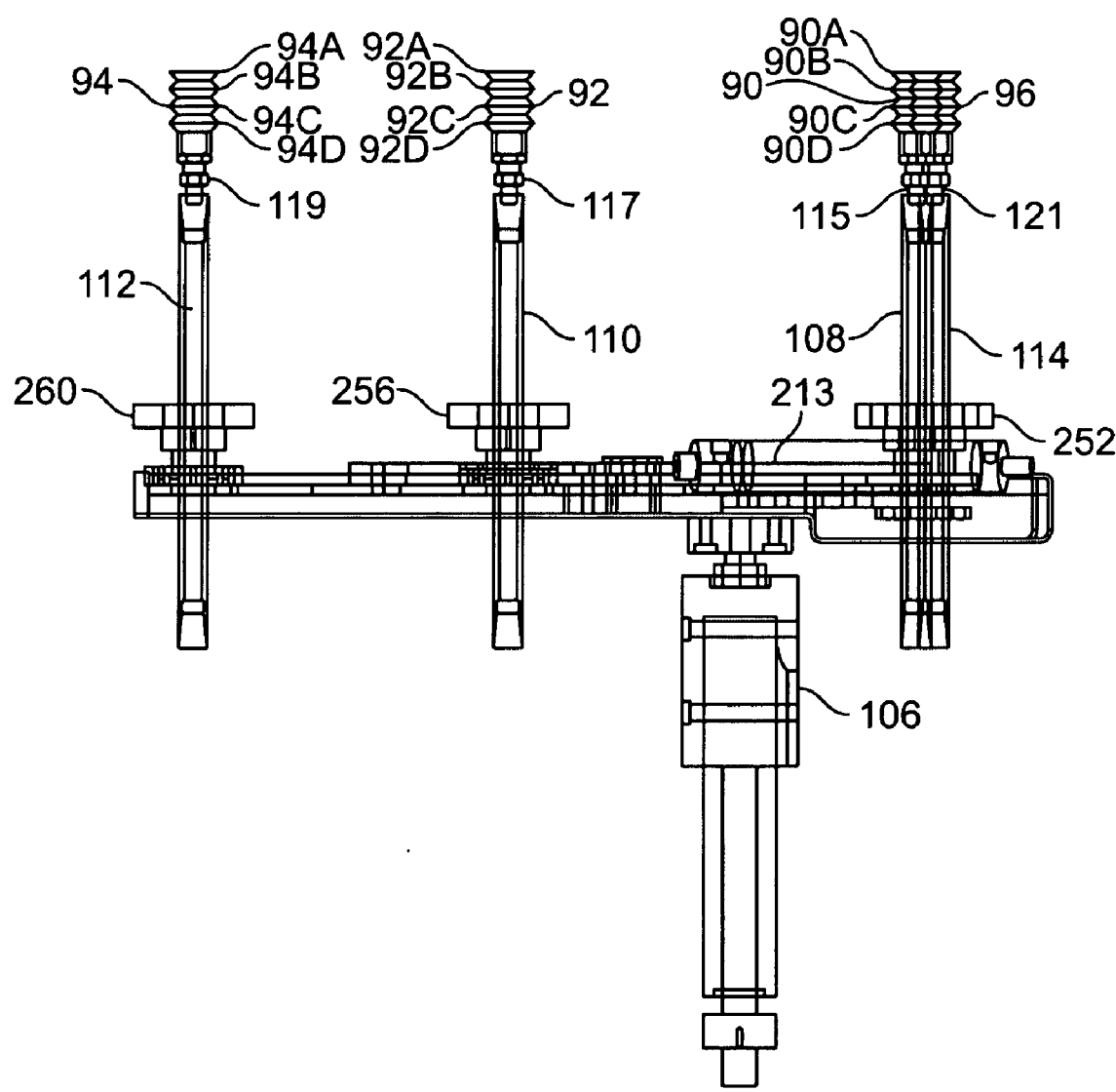
FIG. 7 of the drawings is a side view of the suction cups, shafts and bellows assembly of FIG. 6.
Figure 8:
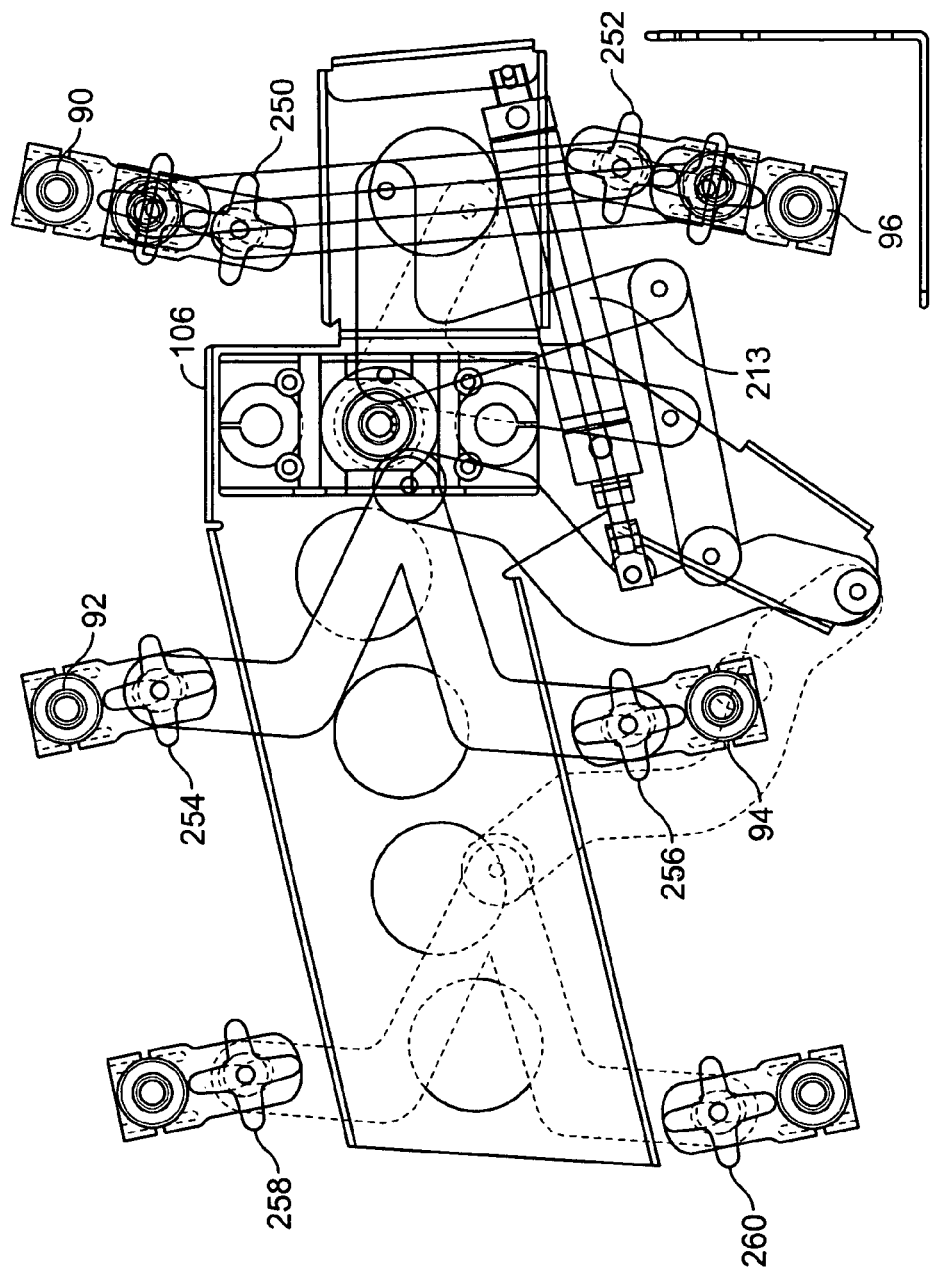
FIG. 8 of the drawings is a top schematic view of the suction cups, shafts and bellows assembly of FIGS. 6 and 7, showing pivotable and adjustable arms which effect selected movement of the suction cups to a desired position for each tray size.
Figure 9:
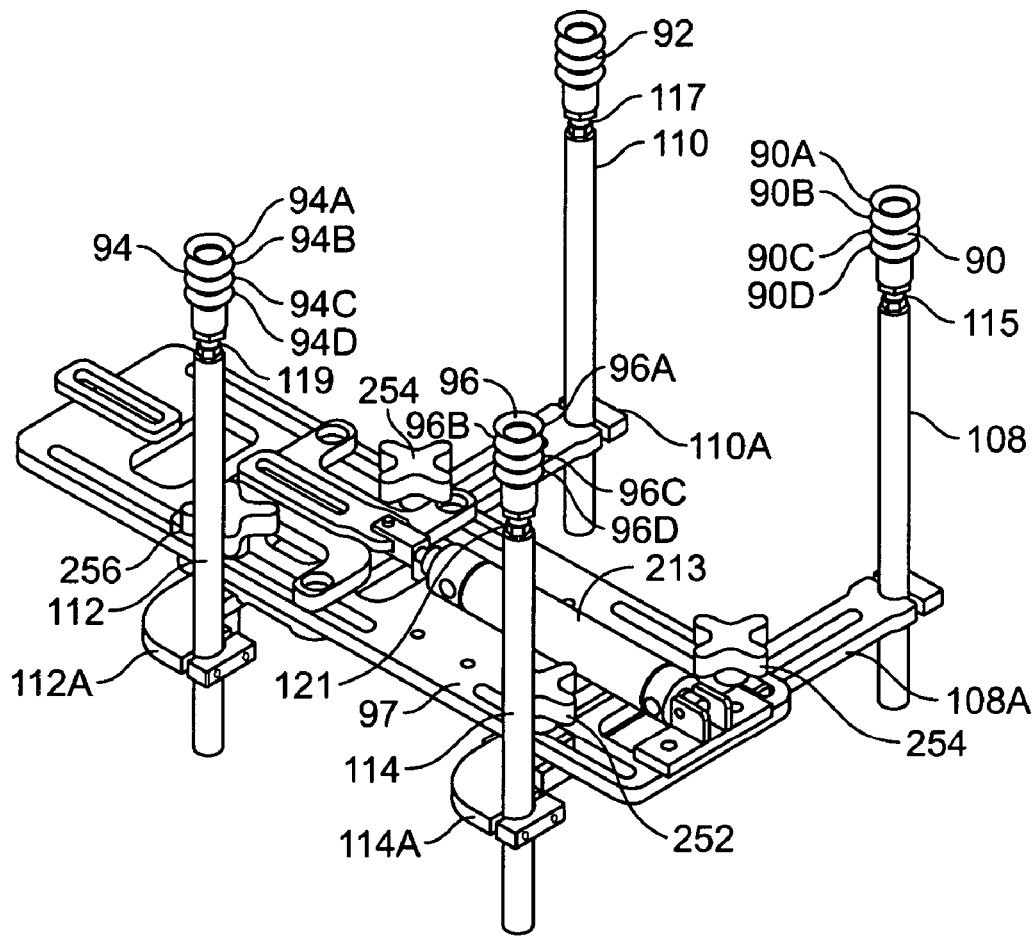
FIG. 9 of the drawings is a front perspective view of the suction cups and shafts of FIGS. 6, 7 and 8 mounted on a suction base plate and showing an air cylinder for selective movement of the shafts and suction cups.
Figure 10:
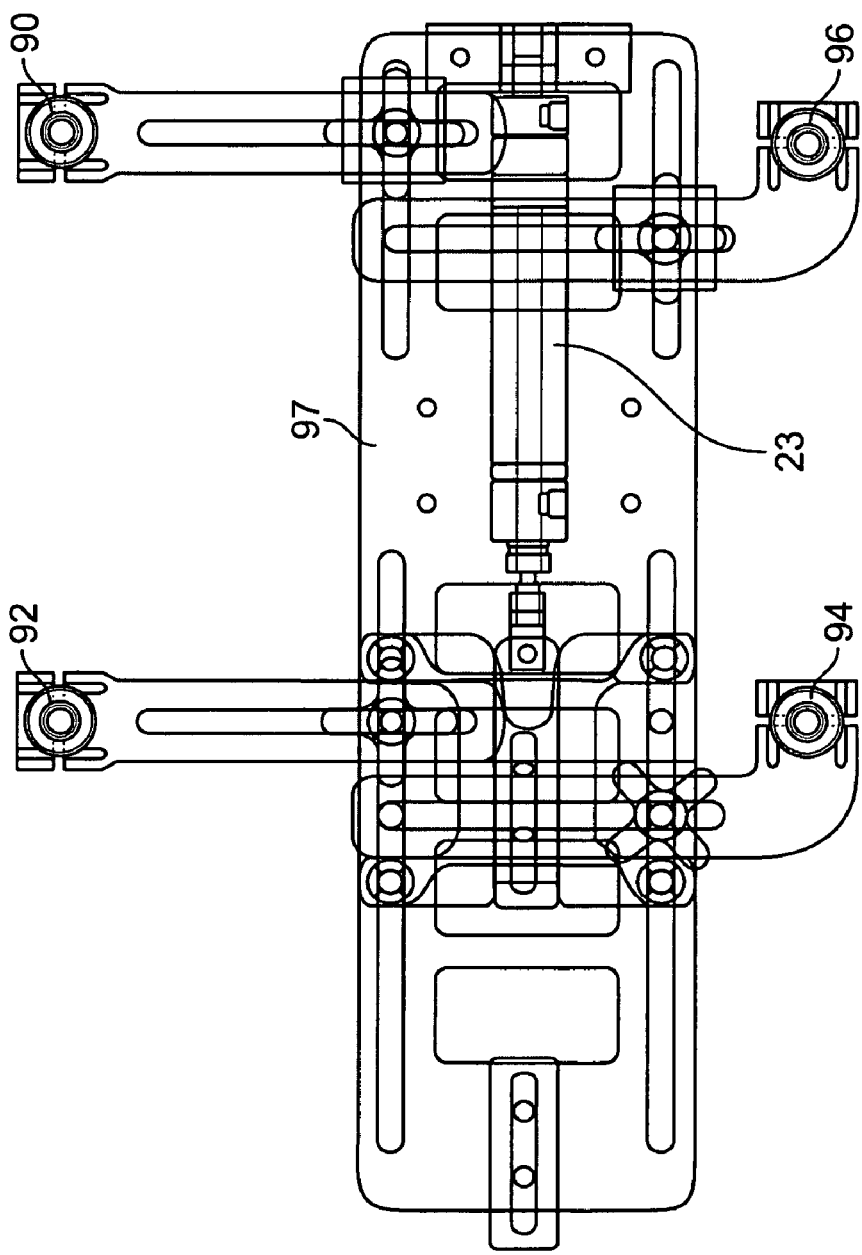
FIG. 10 of the drawings is a top view of the suction base plate having shafts, suction cups and an air cylinder disposed thereon.
Figure 13:
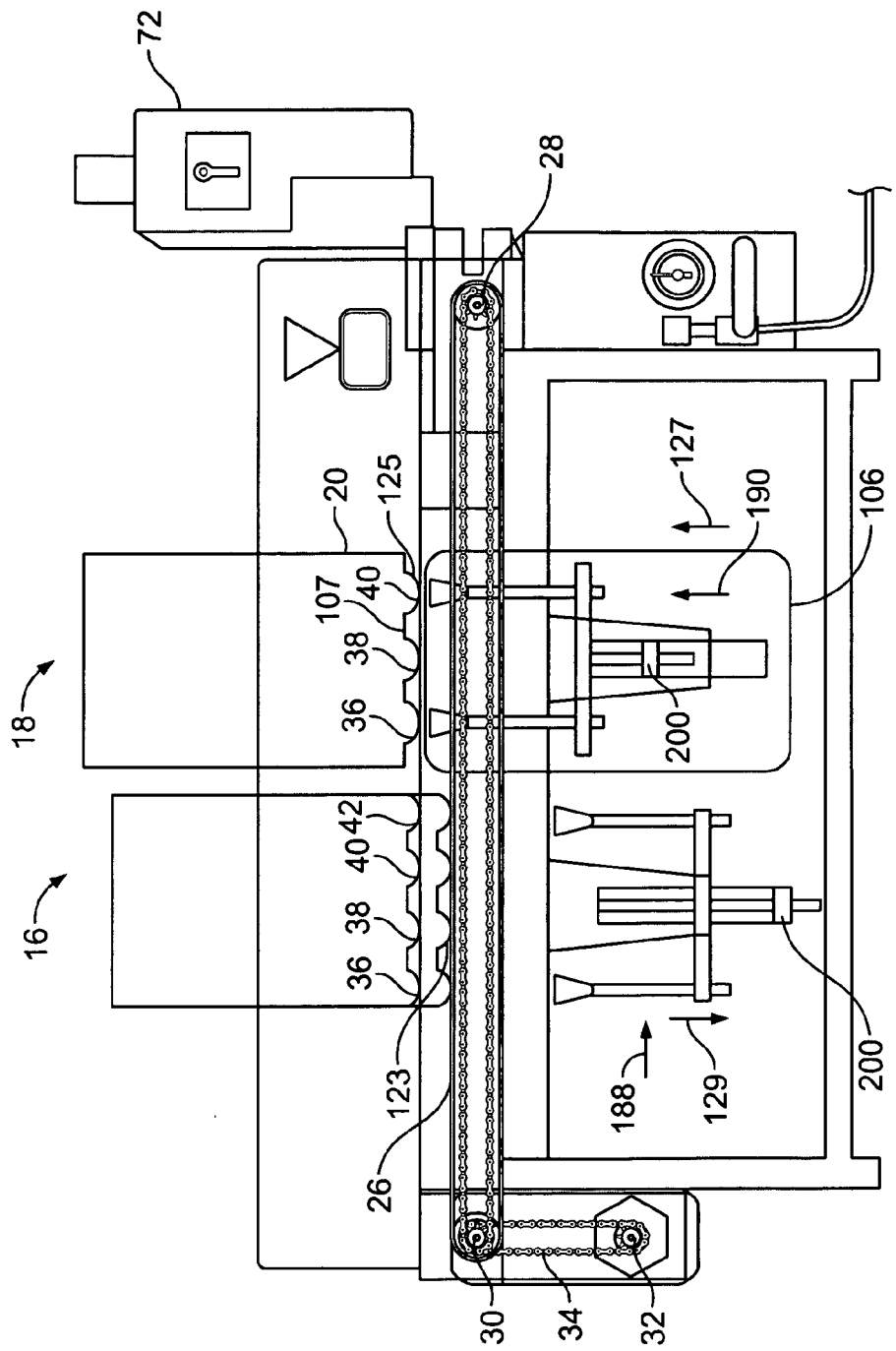
FIG. 13 of the drawings is a side view, partially broken away, showing the tray denester of FIG. 1 and showing, in particular, two stacks of trays in parallel receptacles, two bellows and suction cup assemblies, a conveyor belt for receiving trays after they have been denested, a drive motor and a drive chain for the conveyor belt, a magnetic position sensor to determine the proximity of trays, an air supply valve for providing pneumatic force to the bellows and for creating a vacuum in the suction cups, and a control panel for operating the denester.

As best seen in FIGS. 1 and 6 through 10, the means 24 for denesting a single tray 20 from the stack of trays 16 and 18 includes at least one set 88 of soft flexible suction cups 90, 92, 94 and 96. As shown in FIG. 1, similarly, (although partially obscured in FIG. 1), a set of suction cups 98-104 may be utilized for denesting trays 20 from the stack of trays 16 in first receptacle 12. As seen in FIGS. 6 and 7, flexible suction cups 90-96 are disposed on and operatively connected to a bellows assembly 106 and, as shown in FIGS. 1 and 13, are disposed in a first position below conveyor belt 26. They may then be extended through conveyor belt 26 into contact with trays 20 as best seen in FIG. 13. As a result, when extended, suction cups 90-96 adhere to the bottom surface 107 of tray 20 which may then be drawn downwardly by bellows 106 so as to deposit tray 20 onto conveyor belt 26. Vacuum is then released from suction cups 90-96 allowing tray 20 to advance along conveyor belt 26. As shown in FIG. 9 of the drawings, the suction cups 90, 92, 94, and 96 and shafts 108, 110, 112 and 114 of FIGS. 6, 7 and 8 are mounted on a suction base plate 97, which has an air cylinder 213 for selective movement of the shafts 108, 110, 112 and 114.

As further seen in FIGS. 6-9, suction cups 90-96 are each mounted on a hollow shafts 108, 110, 112 and 114 respectively which in turn are connected to a source of vacuum 210 and 212 through bellows mechanism 106. Soft flexible suction cups 90 are mounted at the top ends 115, 117, 119 and 121 of shafts 108, 110, 112 and 114.

In order to compress suction cups 90-96 against tray bottom 108, suction cups 90-96 are preferably constructed in a ribbed configuration, being hollow on the inside and having a plurality of curved ribs 90A-90D, 92A-D, 94A-D, and 96A-D. This allows cushioning of the suction cups 90-96 against the bottom 108 of tray 20, and compression of the suction cups 90-96 against bottom 107 of tray 20. This provides a better vacuum seal and improved gripping of the irregular surface of the bottom 108 of the molded fiber tray 20.

As further seen in FIGS. 7-10, the horizontal positions of the shafts 108, 110, 112 and 114 can be adjusted by means of air cylinder 213, to move the suction cups 90, 92, 94 and 96 to the desired position for each size tray to be denested. These positions and adjustments can be stored in computer 74 or done manually. Shafts 108, 110, 112 and 114 are perpendicularly mounted on selectively pivotable and extendable arms 108A, 11A, 112A and 114A and are moved by cylinder 213.

Returning to FIG. 13, receptacles 12 and 14 maintain each of the plurality of packing trays 16 and 18 in face-up alignment and biased towards the bottom end 123 and 125 of receptacles 16 and 18. When tray denesting apparatus 24 is utilized, shafts 108, 110, 112 and 114 are moved upwardly, in direction 127 or downwardly in direction 129.

Figure 11:
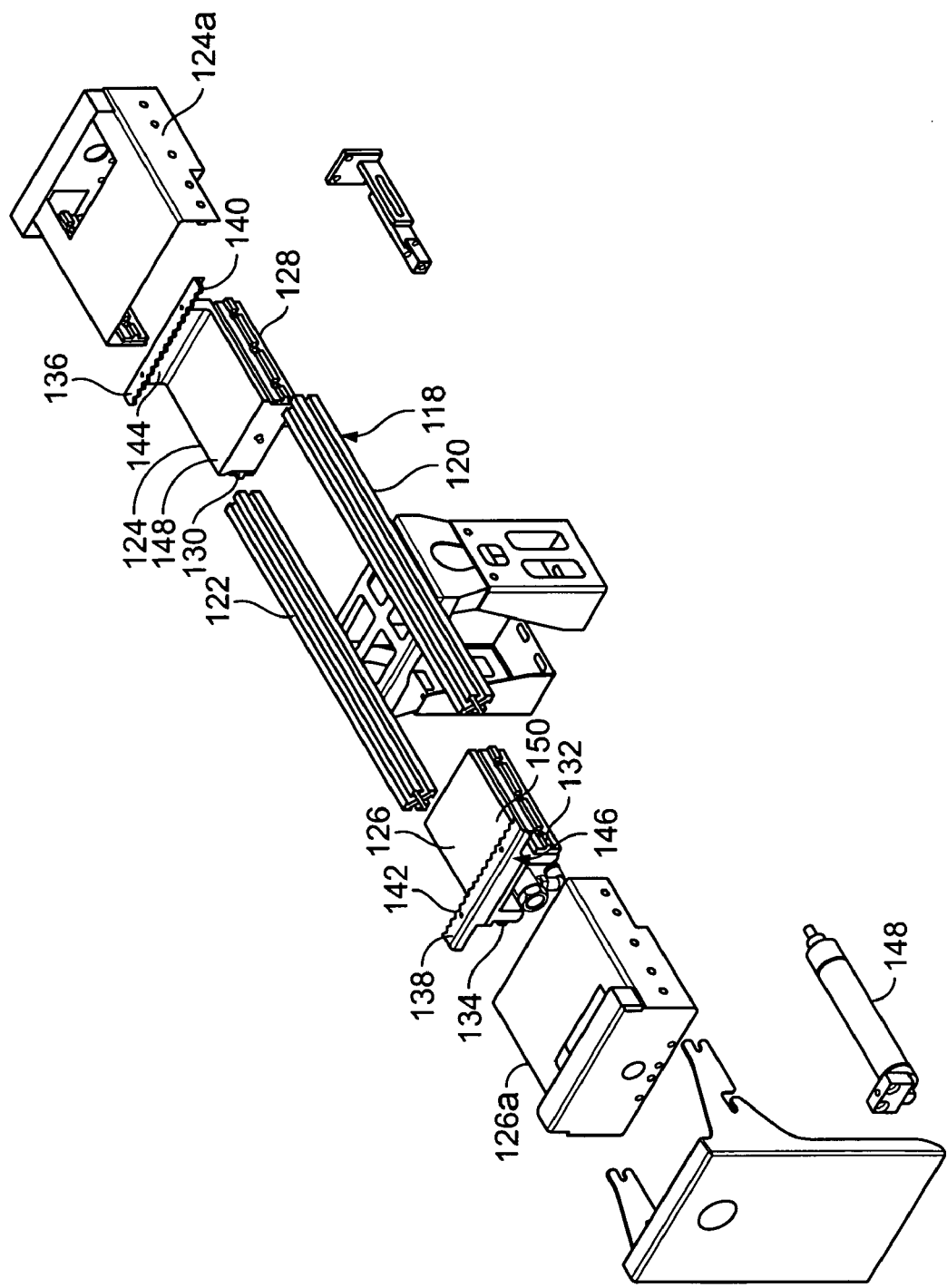
FIG. 11 of the drawings is an exploded front perspective view of a gripper blade assembly for use in the tray denester of FIG. 1.
Figure 12:
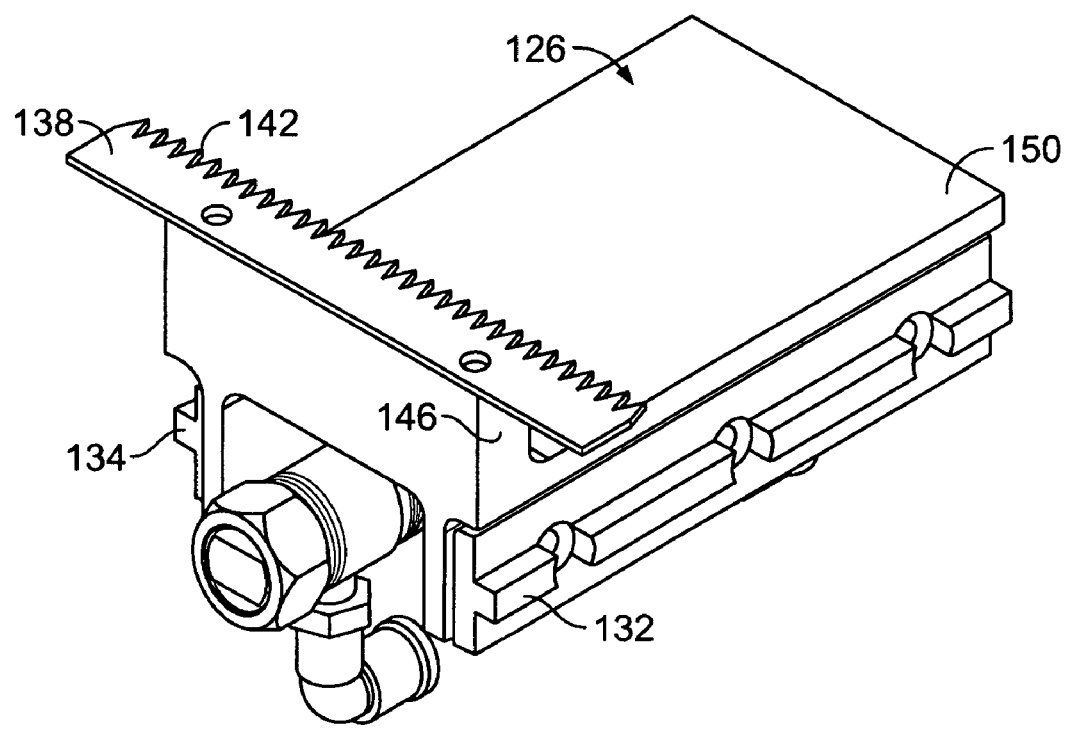
FIG. 12 of the drawings is a front perspective view of the gripper blade holder assembly, blade holder and blade utilized in the gripper blade assembly of FIG. 11.

As mentioned previously, tray denesting apparatus 10 is particularly designed for denesting molded fiber trays 20 used for carrying fruit. The irregular surfaces on a molded fiber tray 20 make it difficult to grasp from below or from its edges due to the flexibility of the side edges of the tray. It has been found, as seen in FIGS. 11 and 12, that an additional means of denesting trays generally and on molded fiber trays in particular, is through the use of a gripper blade assembly 116, which may be included as part of the mechanism 24 for denesting trays. Gripper blade assembly 116 includes a gripper blade slide assembly 118, gripper blade slide assembly 118 includes a pair of tracks 120 and 122, a pair of blade holder assemblies 124 and 126 having ribs 128, 130, 132 and 134 extending laterally therefrom. Ribs 128, 130, 132 and 134 are sized and positioned for sliding engagement within tubular tracks 120 and 122. Gripper blades 136 and 138 are mounted respectively on gripper blade holders 124 and 126. In the embodiment shown, gripper blades 136 and 138 have a series of serrated teeth 140 and 142 extending along one edge of gripper blades 136 and 138, respectively. Gripper blade holders 124 and 126 each further have a pillar 144 and 146, respectively upon which gripper blades 136 and 138 each rest. Gripper blades 136 and 138 are positioned and aligned horizontally with the toothed surfaces 140 and 142 when facing each other. When actuated by pneumatic cylinder 148, gripper blade holders 124 and 126 may be selectively advanced towards each other or retracted away from each other. Gripper blades 136 and 138 also rest in an elevated position on pillars 144 and 146 so that tray 20 can rest on top of the top body surface 150 and 152 respectively of gripper blade holders 124 and 126, and in fact surfaces 150 and 152 can be slid along the bottom of tray 20 until toothed edges 140 and 142 grip the lateral edges of tray 20. Gripper blade holders 124 and 126 in turn, when retracted, slide into and are enclosed within gripper blade covers 124A and 126A so as to allow free movement of tray 20 along conveyor 26.

In the preferred embodiment gripper blade assembly 116 is mounted on bellows assembly 106 so that when suction cups 90, 92, 94 and 96 grip tray the bottom surface 148 of tray 20, and gripper blades 136 and 138 may be used for further gripping tray 20. Bellows 106 may then be retracted downwardly in direction 152 so as to draw tray 20 down onto the surface of conveyor 26. Gripper blades 136 and 138 may then be separated in direction 154 and suction released from suction cups 90, 92, 94 and 96 thereby allowing tray 20 to be deposited onto conveyor belt 26 and advanced from denester 10. Although in the embodiment shown, pneumatic cylinders are used for advancing and retracting gripper blades 134 and 136, other commonly known means of advancing and retracting mechanical mechanisms such as electric motors, hydraulic means or even gears connected to bellows mechanism 106 may be utilized.

Figure 15:
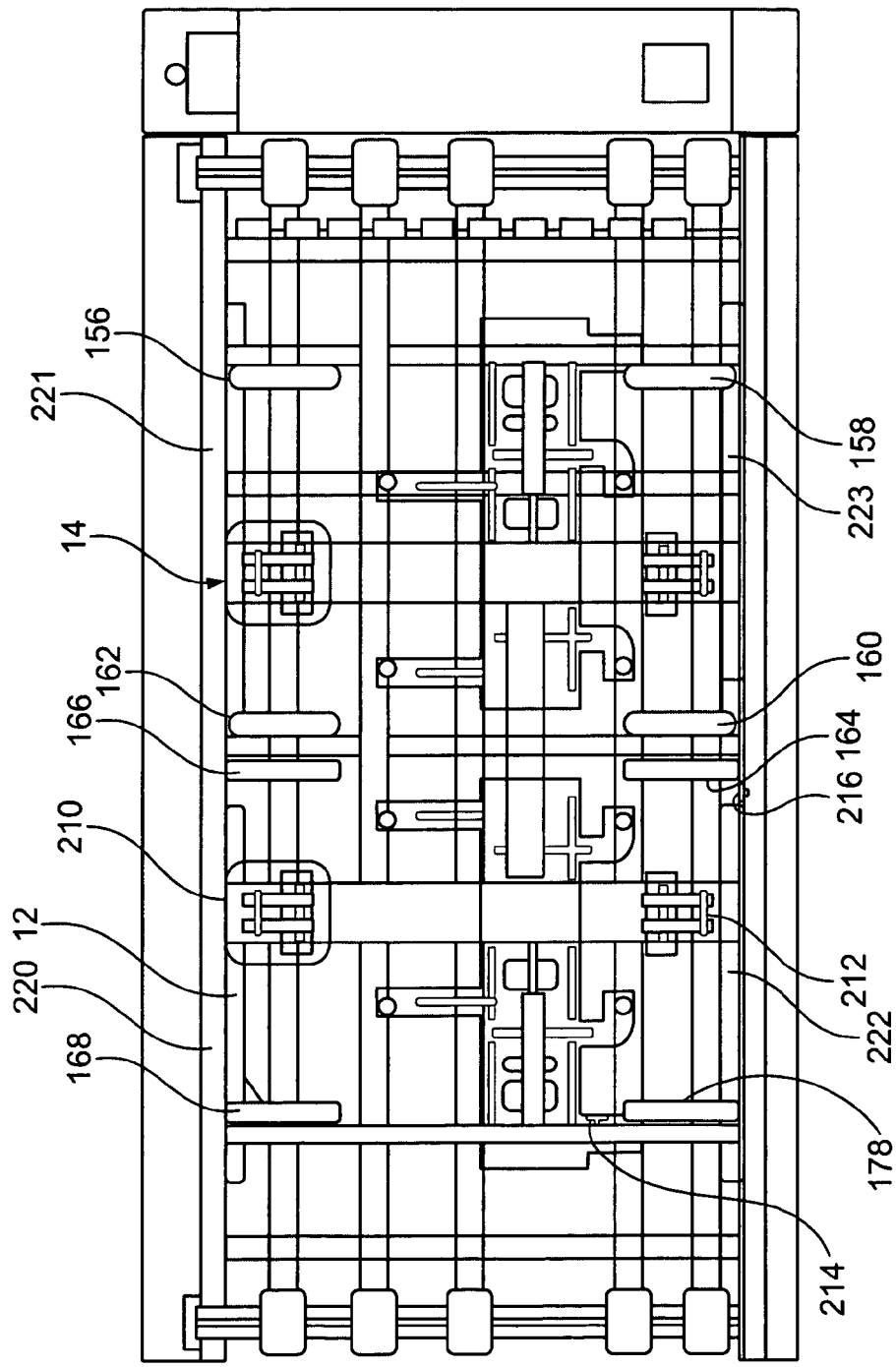
FIG. 15 of the drawings is a top view of the tray denester of FIGS. 13 and 14, showing in particular proximity sensors and tray clamps in the tray receptacles, a stack of nested trays in the tray clamps and the vacuum pumps used for providing suction to the suction cups.

As best seen in FIGS. 1 and 15 of the drawings, in a preferred embodiment, receptacles 12 and 14 include a plurality of tray clamps 156, 158, 160 and 162 in tray receptacle 14 and tray clamps 164, 166, 168 and 170 in tray receptacle 12. In a preferred embodiment tray clamps 156-170, in the embodiment shown, are substantially "L" shaped plates laterally disposed in the four corners of each receptacle. The flat surfaces of tray clamps 158-170 facilitate reception of tray stacks 16 and 18 and, but allow sliding of individual trays 20 from the bottom of the receptacles 12 and 14. In this regard, tray clamps 158-170 include spring loaded flaps (best seen in FIG. 1) extending therefrom, numbered 172, 174, 176, 178, 180, 182, 184 and 186. Spring loaded flaps 172-186 facilitate loading of the trays with the spring mechanism (not shown) behind each of the spring loaded flaps 172-186, holding the trays in place while allowing them to be dispensed downwardly within tray denester 10. Thus, tray clamps 156-170 holds the tray in place but allow them to be denested.

In a preferred embodiment in the invention, the tray denester 10 of the present invention can deliver a maximum of 35 standard trays 20 or 23 Euro Trays®, permitting side by side to a packing line. The trays can be delivered using an interlocking pattern, as required.

In order to control the bellows mechanism 106 of the present invention, as seen in FIG. 13, a plurality of magnetic position sensors or reed switches 200 may be utilized. The reed sensors are positioned to alert the control mechanism 72 that the bellows mechanism and thereby the suction cups and shafts are either at the low position 188 below the conveyor 26 in which a tray has been deposited on conveyor 26 or in the extended position 190 to in which the suction cups 90-98 are abutting against the bottom surface 148 of tray 20, best seen in FIG. 13.

Figure 14:
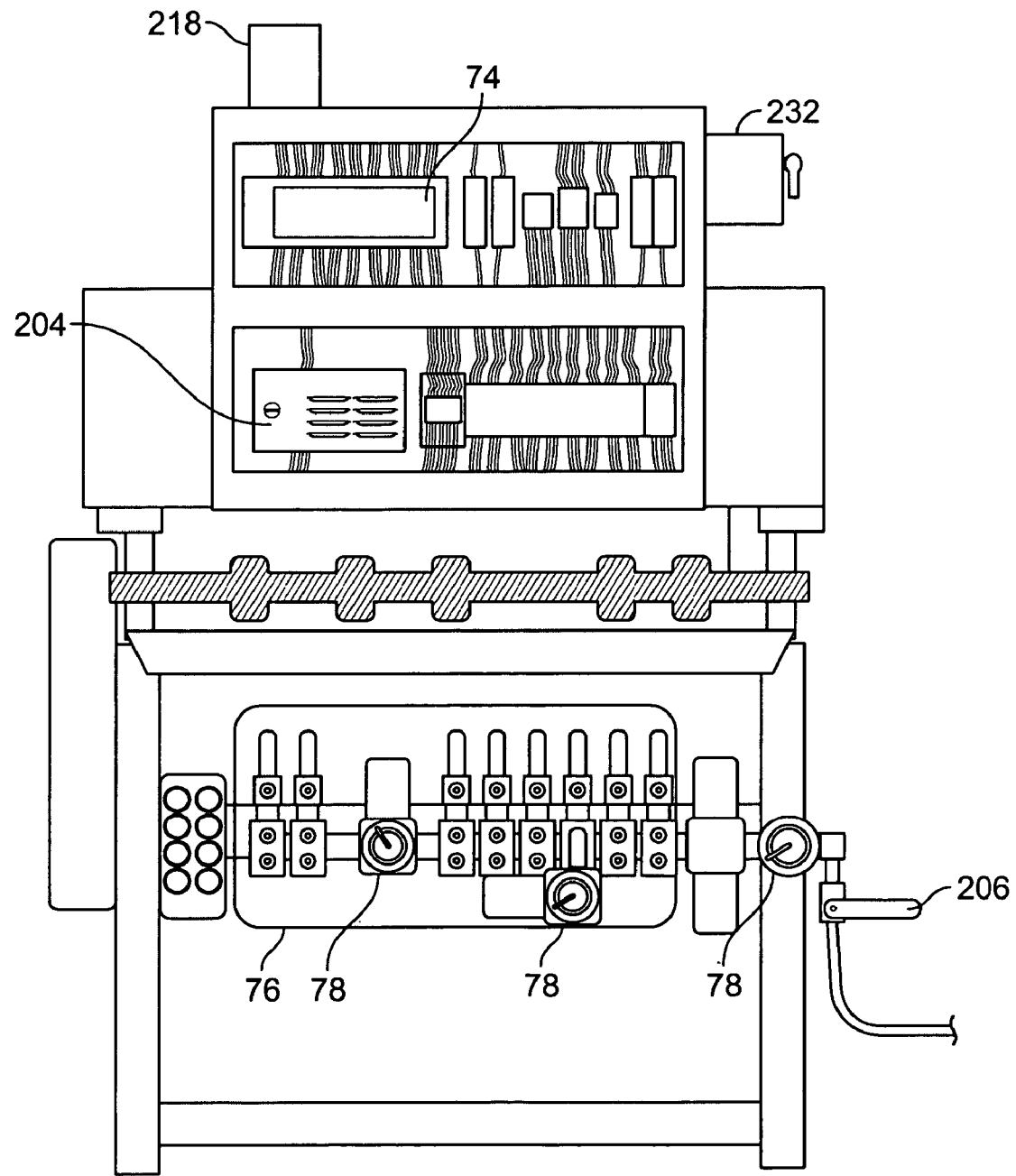
FIG. 14 of the drawings is a front view of the control panel of FIG. 13, showing in particular pneumatic cylinders and solenoid valves, air pressure regulators, an air supply valve, wiring terminals, a DC power supply, a programmable controller, a main power disconnect and a warning light for jams.
Figure 16:
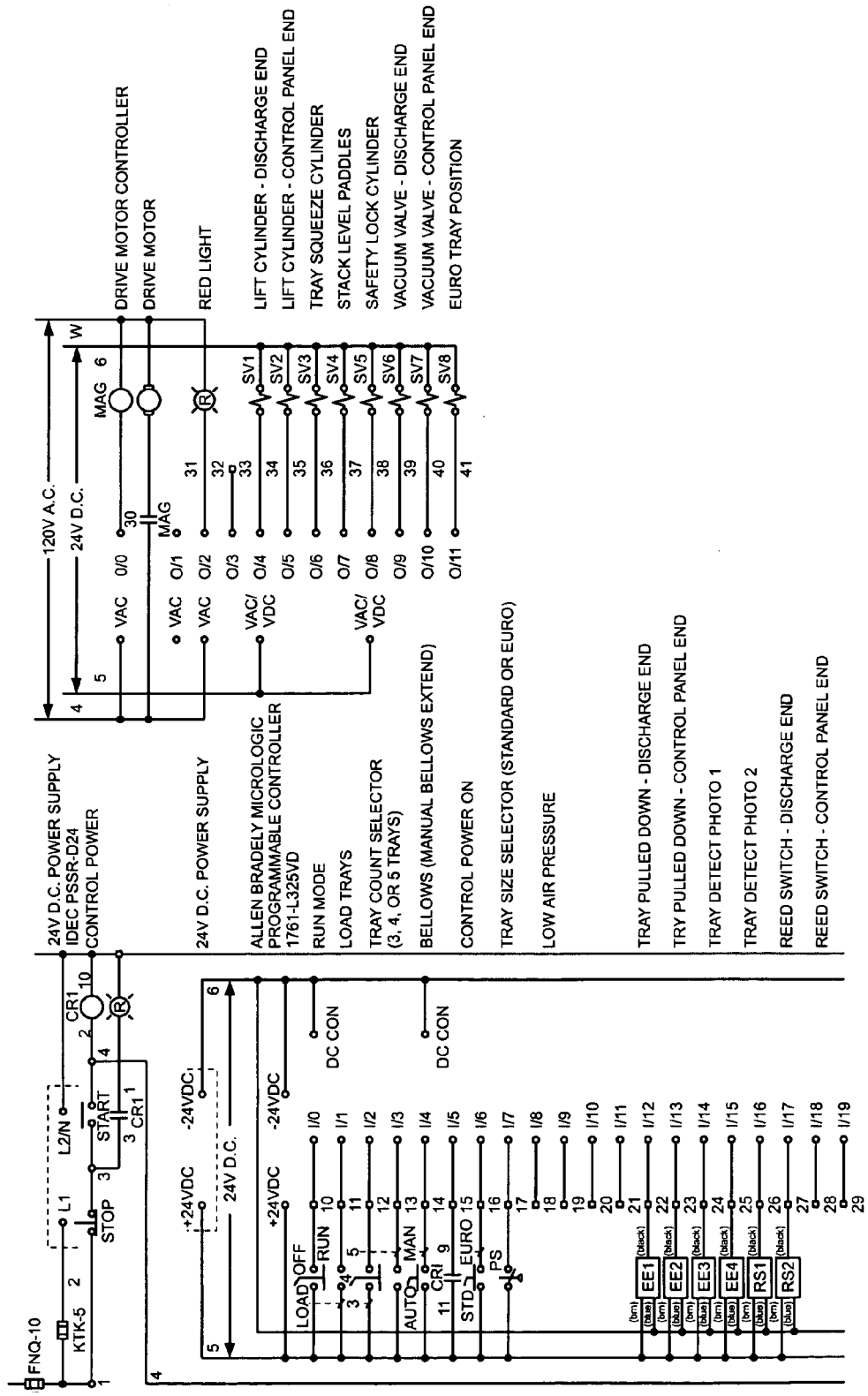
FIG. 16 of the drawings is a electrical schematic of the tray denester of the present invention.
Figure 17:
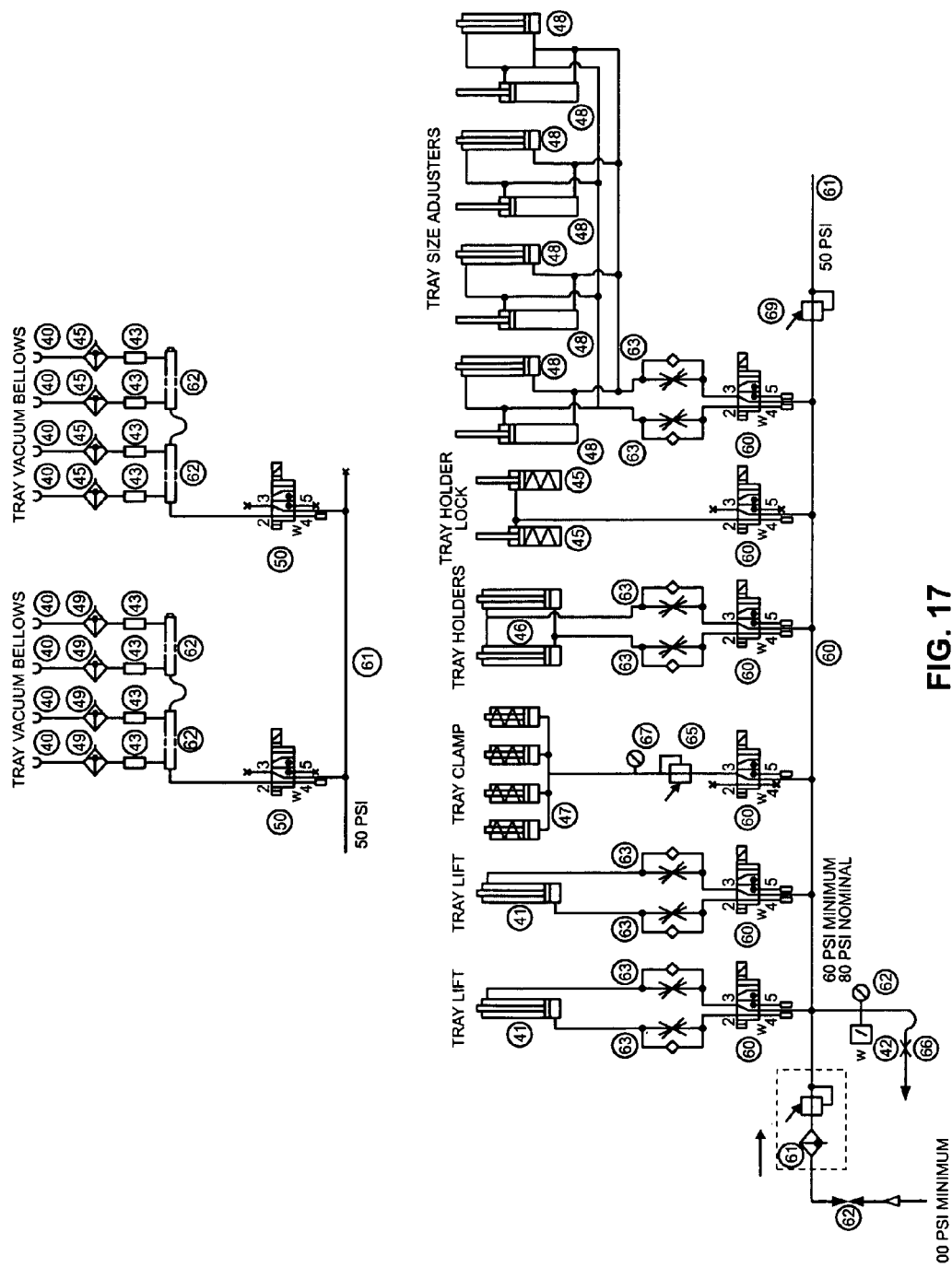
FIG. 17 of the drawings is a pneumatic schematic of the tray denester of the present invention.
Figure 18:
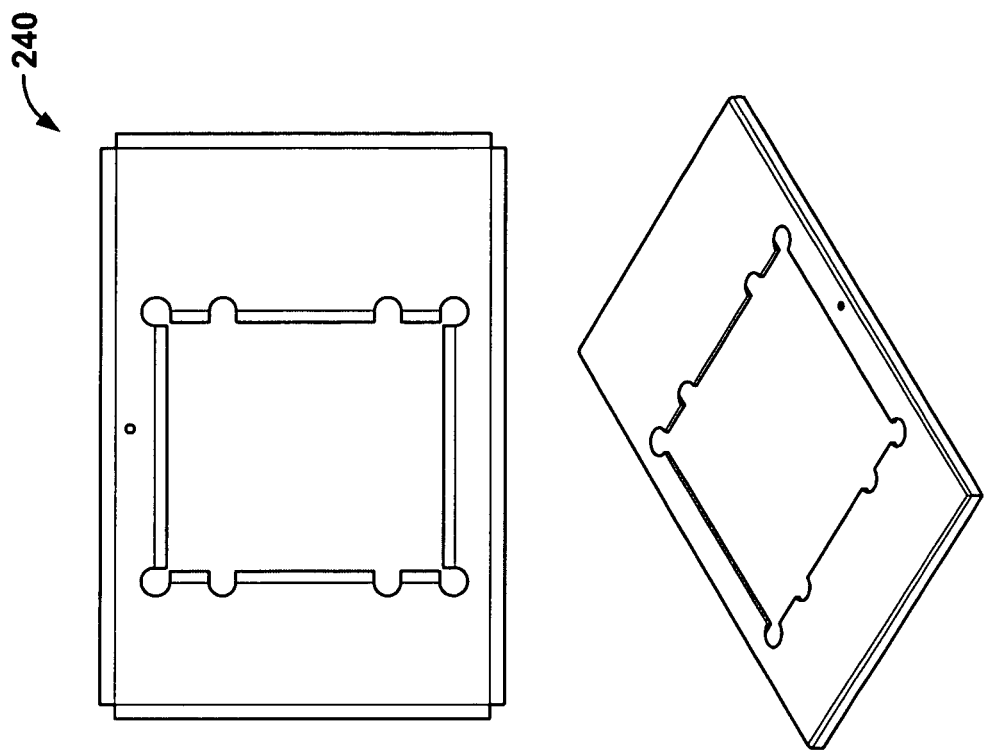
FIG. 18 of the drawings is a front prospective view of a suction cup template used for adjusting the position of the suction cups shown in FIGS. 1, and 6-10 for desired sized tray.
Figure 18:
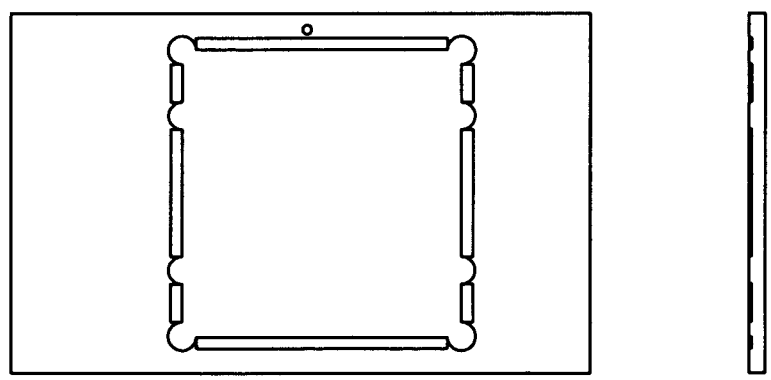

As seen in FIG. 14, control mechanism 72 contains a programmable controller; i.e., computer 74, a DC power supply tool 204, pneumatic cylinders and solenoid valves 76, air pressure regulator 78 and an air supply valve 206. By means of the pneumatic cylinder 76 the size of receptacles 12 and 14 can be adjusted using the controls 208, 206 shown in FIG. 1 on control mechanism 72, and the position of suction cups 90, 92, 94 and 96 can be moved. Electrical and pneumatic schematics of the control mechanism 72 may be seen in FIGS. 16 and 17.

As shown in FIG. 15, vacuum pumps 210, 212 are disposed on bellows 106 for providing vacuum to suction cups 90-98. In order to determine whether trays are present, proximity sensors (electric eyes) 214 and 216 are provided. Proximity sensors 214 and 216 can also determine the appropriate distance between the front and rear of receptacle 12.

In use, prior to operation, the operator selects the required tray size 20 and a layer count to match production requirements. By layer count it is meant whether to have alternating sized trays or to provide a reverse position of trays in receptacles 12 and 14 for later stacking with product contained therein. Trays 16 and 18 are then loaded into the receptacles 12 and 14. Proximity sensors 214 and 216 then monitor the position of the trays 20 in the stacks 16 and 18 and on the conveyor belt 26. The tray denester 10 will not begin a cycle unless the conveyor belt 26 is clear and no trays 20 are jammed, as determined by the proximity sensors. A warning light 218, best seen in FIG. 14, alerts the operator if there is a tray jam, if there are no trays or if air pressure is too low to operate.

As best seen in FIGS. 1 and 15, reset platforms 220, 221, 222 and 223 are laterally disposed along tray denester 10 and in parallel to conveyor belts 26. The reset platforms 220 and 222 support and align the stacks 12 of trays 20. The forward tray clamps 164, 166, 168 and 170 are extended to secure the stack 18. Reset platforms 220 and 222 are then retracted. The tray stack 18 is now held from the sides by the tray clamps 164-170 so that the bottom tray 20 can be denested. The bellows 106 rises to meet the stack 16 by means of either a hydraulic cylinder 107 or a pneumatic cylinder. The vacuum pumps 210 and 212 convey a vacuum through the suction cups which are advanced separately to the bottom of the tray 20. The bottom tray is then removed from the stack by lowering the bellows until the tray 20 contacts the belt conveyor 26. A magnetic position sensor 230 triggers release of the vacuum seal of the suction cups before the tray 20 hits the conveyor 26. A short burst of air from the air pump 206 then cleans the suction cups. The drive motor 32 runs constantly driving the conveyor belt 26 which transfers each tray 20 onto a packing line (not shown). The reset platforms 222 and 224 are then extended to support the stack of trays 16 and 18 and the tray clamps 158-170 are then retracted and the operating cycle is complete. Similarly, reset platform 221 and 223 support and align stack 14 of trays 20 and may be withdrawn to allow removal of tray 20 as required.

In operation, the power is turned on by means of a main power disconnect 232 shown in FIG. 14. The tray selector 234 is turned to either standard or Euro position. The load run selector switch 236 is switched to a load position; and the mode switch 238 is switched to three, four or five tray mode. Stack of trays 16 and 18 are placed in the receptacles 12 and 14. The load run selector switch 234 is then placed in a run position. In a preferred embodiment the air pressure used from the air supply 206 is maintained at about 60 psi.

Figure 19:
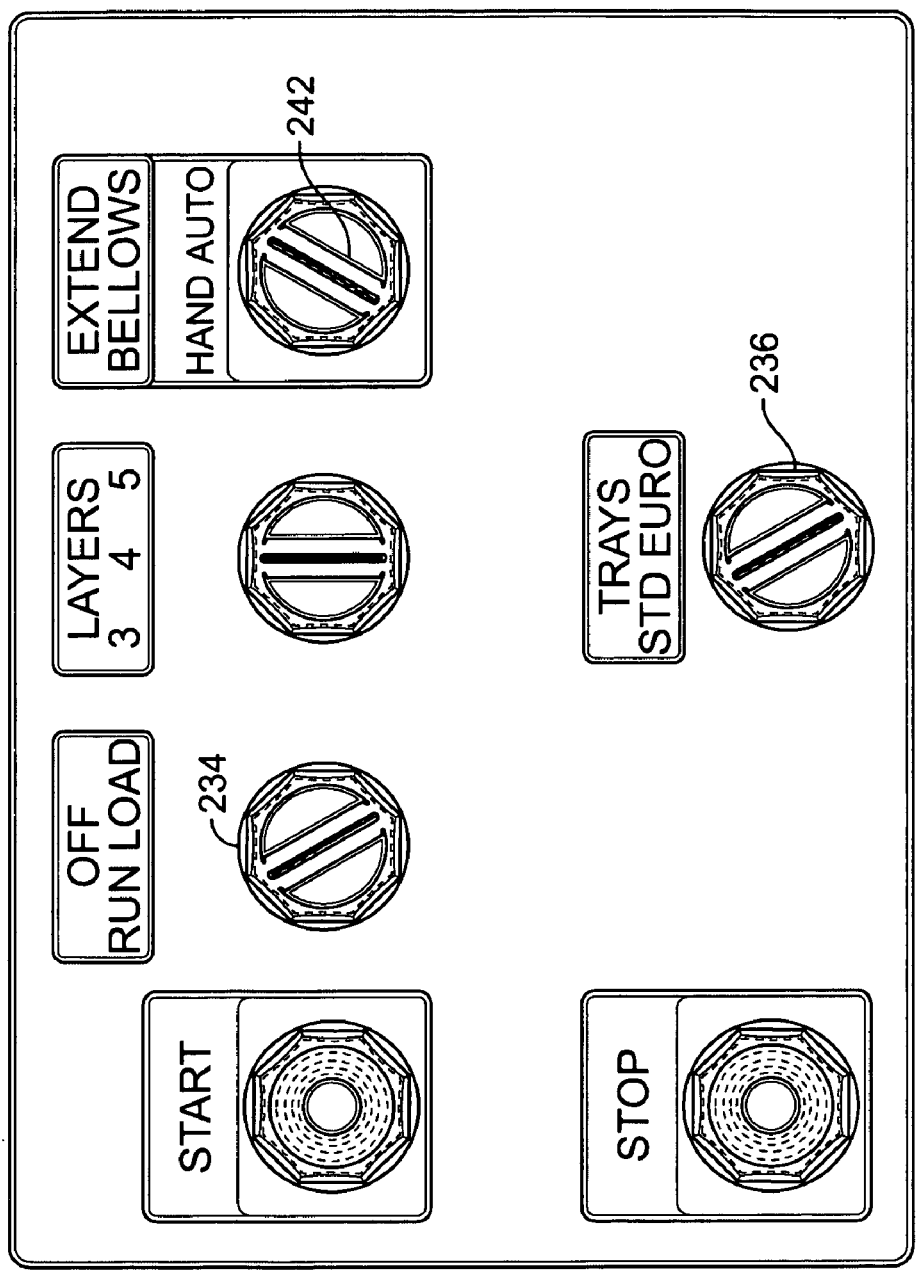
FIG. 19 of the drawings is a front view of the control panel of FIG. 14.

In order to reset the bellows 106 to factory alignment, the machine is placed in the load mode at the selector switch 234 shown in FIG. 19. The tray size switch 236 is set to Euro. This causes the rear, middle and side bars 44, 46, 50 and 52 to move to the Euro position. A template 240, shown in FIG. 18, may be aligned within the receptacle 12 or 14 to ensure proper sizing of the receptacles. The load run selector switch 234 is then turned to the off position. The extend bellows selector switch 242 is actuated causing the bellows 106 to rise. The knobs 250-260 shown in FIG. 6-10, and, in particular, FIGS. 9 and 10 may be loosened and vacuum bellows 106 is adjusted to the Euro position. The knobs 250-260 are then tightened; the raised bellows selector switch 236 is then placed in the retracted bellows position. The mode switch 234 is then placed in the load position, the template 240 is removed and trays 16 and 18 are loaded into the receptacles 12 and 14.

Figure 20:
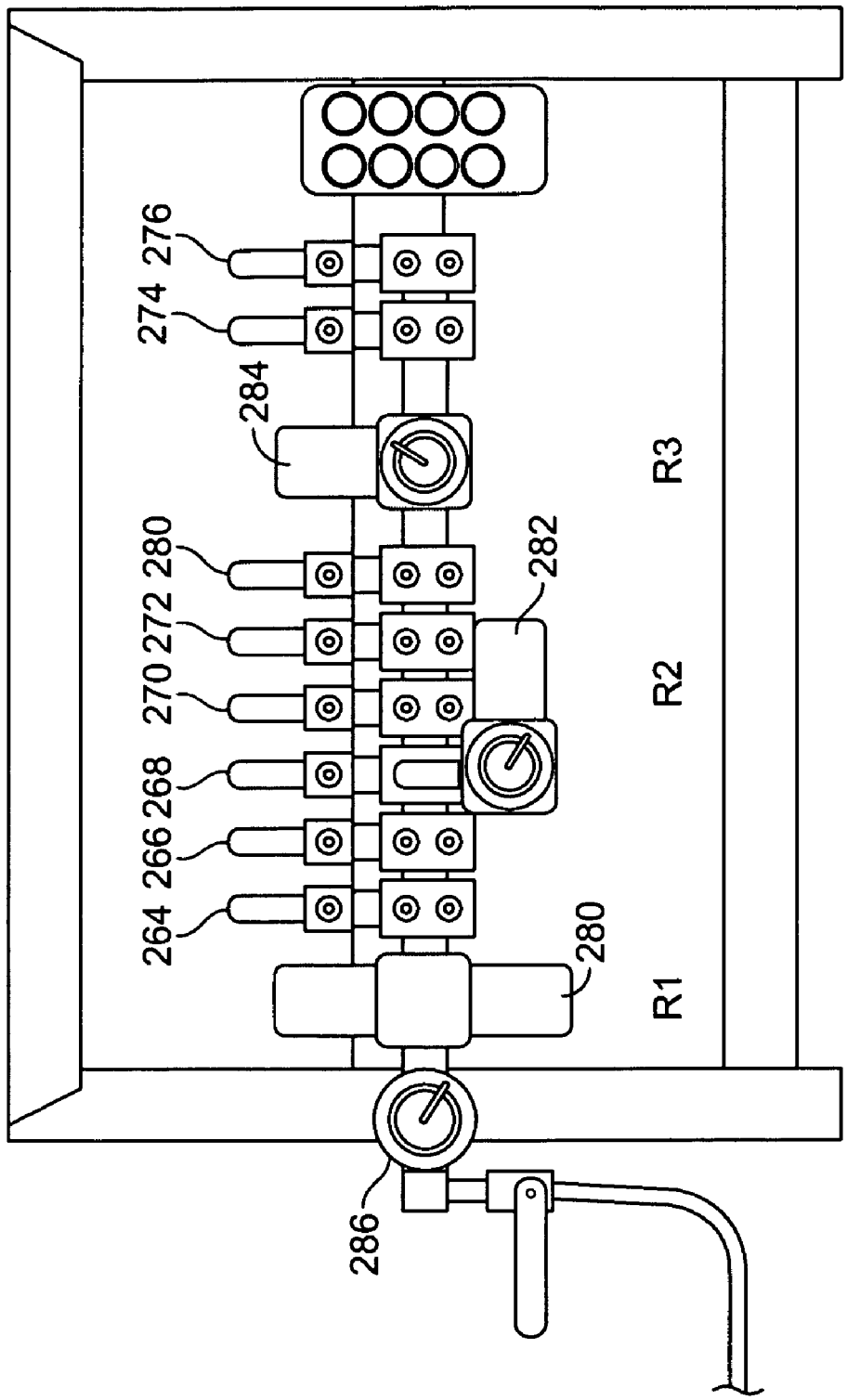
FIG. 20 of the drawings is a front view of the solenoid valves and pressure regulators as shown in the control mechanism of FIG. 14 of the drawings.
Figure 21:
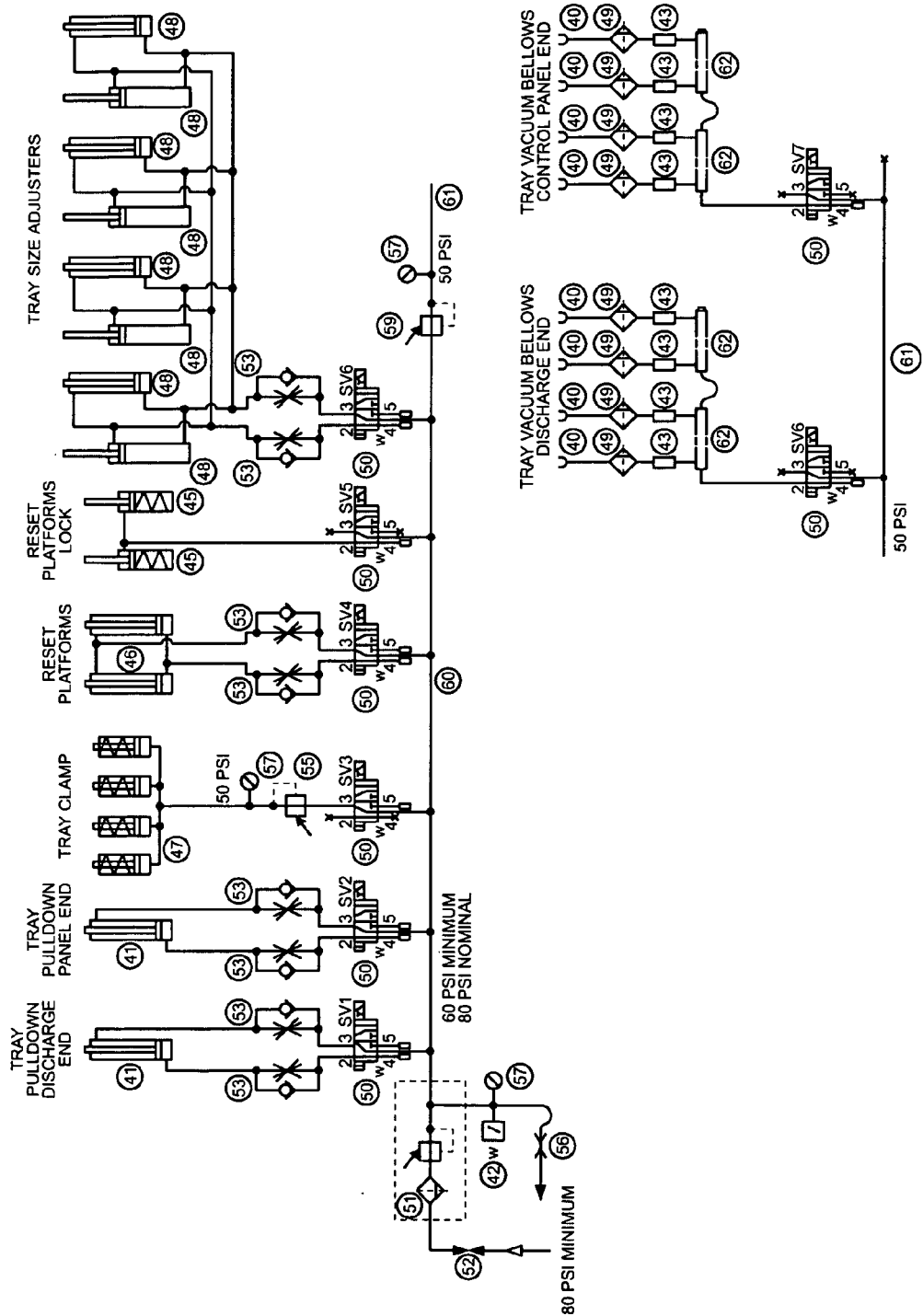
FIG. 21 is a front view of the schematic diagram of the pneumatic system of FIGS. 14 and 20, showing, in particular, the interconnection between a source of pressurized air, the tray pulldown discharge end, the tray pulldown panel end, the tray clamp, the reset platforms, the reset platforms lock, the tray size adjusters, the tray vacuum bellows discharge end, and the tray vacuum bellows control panel end.

The main intake air pressure is preferably 80 psi, vacuum air pressure is preferably 50 psi, and tray clamp air pressure is 50 psi, varying with the height of tray stacks 16 and 18. The air pressure switch 262 is preferably at 60 psi. The solenoid valves 264, 266, 268, 270, 272, 274, 276, and 278, air supply regulator 286, tray clamp regulator 280 and vacuum bellows regulators 282 and 284 are shown in FIG. 20 and FIG. 21.

In order to further explain the operation of the present invention, the Tray Denester Operation and Maintenance manual is attached hereto and incorporated herein. The Tray Denester 10 of the present invention is controlled by an Allen Bradley Micrologic Programmable Controller. All movement of the tray denester 10 is generated by pneumatic cylinders controlled by three-way solenoid valves. The power supply is a 24 volt DC Idec ps5r-e24. Both the mechanical and electric parts are listed in the Spare Parts List on page 30 and 31 of the Operators Manual as is the electrical schematic and the pneumatic schematic on pages 32 and 33 and FIG. 21.

In order to further show operation of the present invention, a computer disk is attached in Windows Media viewer format showing adjustment of the size of the receptacles and use of the suction cups and gripper blade assembly for denesting the bottom tray from a stack of trays in the receptacles.

What is claimed is:

1. A tray denesting apparatus, comprising:
   a receptacle for holding at least one nested stack of trays, the receptacle including an automatic tray size adjustment apparatus movable between a first position and a second position prior to loading a first one of the plurality of trays into the receptacle, wherein the receptacle maintains each of the plurality of trays in a face-up alignment and biased towards a bottom end of said receptacle;
   means for denesting individual trays from said nested stack of trays comprising:
   a bellows assembly having a plurality of shafts with a soft, flexible suction cup being disposed on a top end of each of said plurality of shafts wherein each of the plurality of shafts are movable upwards so that at least one suction cup may adhere to a bottom side of a first one of the nested stack of trays, said bottom side having an irregular surface,
   wherein each of the plurality of shafts is mounted on a suction base plate having an air cylinder that causes each of the plurality of shafts to be individually and selectively movable and adjustable, and a gripper blade assembly means for gripping edges of a bottom tray from the stack of trays for assisting in the denesting of said bottom tray from said stack of trays.

2. The tray denesting apparatus of claim 1 and further comprising:
   a conveyor belt for receiving each of the plurality of trays upon release from the receptacle.

3. The tray denesting apparatus of claim 1, wherein the automatic tray size adjustment apparatus comprises:
   a front adjusting bar;
   a rear adjusting bar, said rear adjusting bar being disposed in parallel alignment with said front adjusting bar;
   a first side adjusting bar; and
   a second side adjusting bar, said second adjusting bar being disposed in parallel alignment with said first side adjusting bar;
   wherein said front adjusting bar is disposed in perpendicular alignment with said first side adjusting bar.

4. The tray denesting apparatus of claim 3, wherein each of said front adjusting bar, said rear adjusting bar, said first side adjusting bar and said second side adjusting bar are variable in length.

5. The tray denesting apparatus of claim 4, wherein each of said front adjusting bar, said rear adjusting bar, said first side adjusting bar and said second side adjusting bar are independently adjustable to move said automatic tray size adjustment apparatus between a first position and a second position.

6. The tray denesting apparatus of claim 5, wherein said automatic tray size adjustment apparatus further comprises a middle adjusting bar, said middle adjusting bar being disposed in perpendicular alignment with both said first side adjusting bar and said second side adjusting bar.

7. The tray denesting apparatus of claim 4, wherein the variable lengths of each of said front adjusting bar, said rear adjusting bar, said first side adjusting bar and said second side adjusting bar may be adjusted by pneumatic means for moving said adjusting bars.

8. The tray denesting apparatus of claim 4, wherein the variable lengths of each of said front adjusting bar, said rear adjusting bar, said first side adjusting bar and said second side adjusting bar may be adjusted by hydraulic means for moving said adjusting bars.

9. The tray denesting apparatus of claim 5, wherein said automatic tray size adjustment apparatus further comprises pneumatic means for moving said adjusting bars between said first position and said second position.

10. The tray denesting apparatus of claim 5, wherein said automatic tray size adjustment apparatus further comprises electric motor means for moving said adjusting bars between said first position and said second position.

11. The tray denesting apparatus of claim 5, wherein said first position of said adjusting bars causes said receptacle to correspond approximately in size to a standard tray size.

12. The tray denesting apparatus of claim 5, wherein said second position of said adjusting bars causes said receptacle to correspond to a Euro tray size.

13. The tray denesting apparatus of claim 1, the apparatus further comprising means for selectively applying a vacuum to said soft flexible, suction cups so as to create a vacuum between said suction cup and said tray.

14. The apparatus of claim 1, wherein said automatic tray size adjustment apparatus further comprises:
   means for storing a plurality of size parameters in a computer and means for actuating said automatic tray size adjustment apparatus to a selected one of said stored size parameters, as required.

15. The tray denesting apparatus of claim 1, wherein said receptacle comprises a plurality of clamp members laterally disposed at the four corners of the receptacle, said clamp members having spring loaded flaps extending therefrom which are sized, constructed and arranged to guide and selectively retain said plurality of trays within said receptacle.

16. The tray denesting apparatus of claim 1 and further comprising:
   a plurality of selectively retractable and extendable reset platform rails laterally disposed proximate the bottom of said receptacle for selectively supporting said nested stack of trays in said receptacle when extended and for permitting dispensing of said trays when retracted.

17. The tray denesting apparatus of claim 16, wherein said reset platform rails are substantially L-shaped in configuration.

18. The tray denesting apparatus of claim 16, wherein said reset platform rails are selectively extended or withdrawn by means of one or more pneumatic cylinders.

19. A molded fiber tray denesting apparatus comprising:
a receptacle for holding a nested stack of molded fiber trays, the receptacle including a tray size adjustment apparatus; wherein the tray size adjustment apparatus is moveable between a first position and a second position prior to loading the first one of the trays into the receptacle, the receptacle maintaining each of the plurality of trays in a face-up alignment and biased towards a bottom end of said receptacle;
at least one set of soft flexible suction cups, each of said set of soft flexible suction cups being constructed and arranged for adherence to an irregular bottom surface of said molded fiber trays, said set of soft flexible suction cups being disposed on a bellows assembly, each suction cup being disposed on a top end of a separate shaft, said bellows assembly being moveable between a bellows first position in which said suction cups are moveable upwards to contact with the first one of said trays in said stack of trays and a bellows second position in which said soft flexible suction cups are retracted from contact with the first one of said trays in said stack of trays for denesting individual molded fiber trays from said nested stack of molded fiber trays, and
wherein each separate shaft is mounted on a suction base plate having an air cylinder that causes each separate shaft to be individually and selectively movable and adjustable and a gripper blade assembly means for gripping edges of a bottom tray from the stack of trays for assisting in the denesting of said bottom tray from said stack of trays.

20. The molded fiber tray denesting apparatus of claim 19, wherein said denesting apparatus further comprises:
means for providing a vacuum to said soft flexible suction cups so as to selectively cause adherence of said suction cups sequentially to a bottom one of said trays in said stack of trays and to release said vacuum after said bellows is moved to said second position.

21. A tray denesting apparatus, comprising:
a receptacle for holding at least one nested stack of trays, the receptacle including an automatic tray size adjustment apparatus movable between a first position and a second position prior to loading a first one of the plurality of trays into the receptacle, wherein the receptacle maintains each of the plurality of trays in a face-up alignment and biased towards a bottom end of said receptacle;
means for denesting individual trays from said nested stack of trays comprising:
a bellows assembly having a plurality of independently and selectively pivotable and extendable arms and a plurality of shafts, each shaft mounted on one of the plurality of arms, with a soft, flexible suction cup being disposed on a top end of each of said plurality of shafts wherein each of the plurality of shafts are movable upwards so that at least one suction cup may adhere to a bottom side of a first one of the nested stack of trays, said bottom side having an irregular surface,
wherein each of the plurality of shafts is mounted on a suction base plate having an air cylinder that causes each of the plurality of shafts to be individually and selectively movable and adjustable, and a gripper blade assembly means for gripping edges of a bottom tray from the stack of trays for assisting in the denesting of said bottom tray from said stack of trays.

* * * * *